(12) United States Patent
Hoetzl et al.

(10) Patent No.: US 6,505,483 B1
(45) Date of Patent: Jan. 14, 2003

(54) GLASS TRANSPORTATION SYSTEM

(75) Inventors: Max Hoetzl, Maumee, OH (US); Thomas A. Dunifon, Whitehouse, OH (US); Larry L. Rozevink, Wauseon, OH (US)

(73) Assignees: Surface Combustion, Inc., Maumee, OH (US); Pilkington North America, Inc., Toledo, OH (US)

( * ) Notice: Subject to any disclaimer, the term of this patent is extended or adjusted under 35 U.S.C. 154(b) by 0 days.

(21) Appl. No.: 09/514,007

(22) Filed: Feb. 25, 2000

(51) Int. Cl.[7] .......................... C03B 35/00; C03B 40/02
(52) U.S. Cl. .................... 65/25.2; 65/25.1; 65/25.4; 65/29.15; 65/110; 65/182.1; 65/182.2; 198/493; 198/721; 406/70; 406/88; 266/103; 266/111; 266/274
(58) Field of Search ................... 65/25.1, 25.2, 65/25.4, 29.15, 110, 182.1, 182.2; 198/493, 721; 406/70, 88; 266/103, 111, 274

(56) References Cited

U.S. PATENT DOCUMENTS

| | | | |
|---|---|---|---|
| 2,848,820 A | * | 8/1958 | Wallin et al. .................. 65/25.2 |
| 3,437,469 A | * | 4/1969 | Peyches et al. ............... 65/25.2 |
| 3,473,910 A | * | 10/1969 | Wilde et al. |
| 4,204,845 A | * | 5/1980 | Shields et al. ................ 65/25.2 |
| 4,432,782 A | | 2/1984 | Seymour |
| 4,612,031 A | | 9/1986 | Bennett et al. |
| 5,004,492 A | | 4/1991 | Borer et al. |
| 5,009,695 A | | 4/1991 | Kuster et al. |
| 5,078,776 A | | 1/1992 | Kajii et al. |
| 5,292,356 A | | 3/1994 | Herrington et al. |
| 5,320,329 A | | 6/1994 | Hoetzl et al. |
| 5,360,203 A | * | 11/1994 | Yamamoto et al. .......... 266/110 |
| 5,735,922 A | | 4/1998 | Woodward et al. |
| 5,755,845 A | | 5/1998 | Woodward et al. |

FOREIGN PATENT DOCUMENTS

WO PCT/US01/02142 5/2002

OTHER PUBLICATIONS

PCT International Search Report; International Application No. PCT/US 01/ 02142; Libbey–Owens–Ford Co. et al.; International Filing Date Jan. 22, 2001; Priority Date Feb. 25, 2000.

* cited by examiner

Primary Examiner—Michael Colaianni
(74) Attorney, Agent, or Firm—Frank J. Nawalanic; Donald A. Schurr

(57) ABSTRACT

A pressure pad array is used to float glass sheets from a glass heating furnace to a ring mold in a press bending station. The pressure pads have transversely spaced, longitudinally-extending slotted nozzles angled towards one another to provide a static pressure area for floating the glass sheet. The slotted nozzles are aligned with the direction of glass sheet travel and the space between adjacent pressure pads is covered by a spacer baffle to generate additional static pressure flotation areas. The static pressure areas formed by the slotted nozzles generally produce uniform pressure profiles extending longitudinally and transversely against the sheet's underside to stably float the glass sheets on a heated gas cushion.

49 Claims, 8 Drawing Sheets

GLASS TRANSPORTATION SYSTEM

INCORPORATION BY REFERENCE

The following patents are incorporated herein and made a part hereof:

U.S. Pat. No. 5,755,845, Issued May 26, 1998 to Woodward et al., entitled "METHOD AND APPARATUS FOR BENDING AND TEMPERING GLASS SHEETS";

U.S. Pat. No. 5,735,922, Issued Apr. 7, 1998 to Woodward et al., entitled "METHOD OF BENDING AND TEMPERING GLASS SHEETS";

U.S. Pat. No. 5,320,329, Issued Jun. 14, 1994 to Hoetzl et al., entitled "PRESSURE PAD FOR STABLY FLOATING THIN STRIP"; and, U.S. Pat. No. 5,292,356, Issued Mar. 8, 1994 to Herrington et al., entitled "SUPPORT MECHANISM FOR A GLASS SHEET PRESS BENDING MOLD".

This invention relates generally to glass sheets and more particularly to apparatus for conveying heated glass sheets to glass forming stations.

The invention is particularly applicable to and will be described with specific reference to a transport system in which glass sheets are conveyed from a furnace to a female ring mold of a press bending station in an integrated manner therewith. However, the invention in its broader sense has application to the conveyance of glass sheets throughout the stages of the glass forming or treating process and in a yet broader sense may be used for conveying any thin sheets of material.

All of the above cited patents do not, per se, form any part of the present invention. They are referenced and incorporated herein so that details relating to known methods and apparatus of bending or forming glass sheets and known strip flotation techniques need not be further described or set forth in detail in the Detailed Description of the Invention.

BACKGROUND

Producing panes of glass for automotive vehicles and the like is a specialized, sophisticated and complex manufacturing process which is constantly subjected to increasingly stringent requirements. The glass must, of course, satisfy numerous safety requirements. Automotive styling trends now require complicated glass curvature shapes, all of which must be made free from surface defects and of high optical quality to permit a distortion free view through the window even though the surfaces can have curvatures in two directions perpendicular to one another. Demands for vehicle weight reduction and increased fuel economy have consistently driven the thickness of the sheet down from traditional levels for laminated glass products such as automotive windshields of about 5 millimeters (two sheets of glass of 2.2–2.3 mm in thickness) to levels around 3 millimeters (two sheets of glass 1.6 mm or less in thickness). Similarly, heat strengthened and/or tempered glass sheets used in, for example, automotive back lights and sidelights are now produced at thicknesses well below 3 mm. Finally, production demands require the glass be produced at relatively short cycle times.

One conventional way to form glass sheet shapes and to which this invention is directed in its preferred embodiment is to form a glass sheet into its configuration by a press bending system in which the pressing step occurs outside the furnace. This system will produce a continuous rapid succession of glass sheets provided that each step in the process can occur rapidly. It has been found to be increasingly difficult to manufacture thin glass sheets of complex shape free of optical distortion. While optical distortion may occur during shaping or bonding, it has been determined that heat-softened glass sheets, especially thin sheets, are susceptible to both distortion and loss of shape from a variety of causes while supported on conventional rollers used in the glass forming process. More particularly, the glass sheets are believed most highly susceptible to distortion when they are transferred by conveyor rollers from the exit end of the furnace to the female ring mold member of a press bending station. The conveyor rollers in this section of the process have an inner, hollow, stationary core member and an outer, flexible, load-carrying sleeve rotatable about the inner core. The conveyor rolls are disclosed and described in U.S. Pat. No. 3,905,794 incorporated herein by reference. The rolls are specially sized and driven so as to be integrated with the female mold ring configuration such as shown in FIG. 10 of the '922 patent. Reference can be had to U.S. Pat. No. 5,004,492 for a further description.

It has long been known to float metal strip and the like produced in continuous strip lines by jet streams of gas emitted from pressure pads which produced specially configured jets. A description of the theory and a discussion of pertinent prior art pressure pad designs is set forth in the '329 patent, which patent including the references incorporated therein by reference are likewise incorporated herein by reference. Specifically, a prior art pressure pad design illustrated in the '329 patent and especially adapted for heating, supporting and conveying thin and thick metal strip is utilized in this invention. As a general observation, suspending a continuous, moving strip of rigid material (typically metal) is significantly different than suspending discrete, moving items having a plastic mass, substance or consistency that is semi-viscous and easily deformable and are literally ejected, serially, from one work station to another. As a more specific observation, pressure pad configurations used in continuous strip lines and the like are generally orientated transverse to the direction of strip travel and spaced from one another to allow heated gases to escape after they have impinged and supported the strip and effected heat transfer therewith, i.e., spent.

Air flotation systems have long been used in glass manufacturing processes where the glass in its semi-viscous, heat softened condition is transported and shaped. In glass systems utilizing an external bending press, air distribution systems have long been used in the male press mold to bend the glass sheet and retain it under vacuum for transfer to subsequent stations such as shown by the glass patents incorporated herein by reference. Air flotation systems have also been used to support glass sheets conveyed in the processing line and reference can be had to U.S. Pat. Nos. 4,432,782 to Seymour; 4,612,031 to Bennett et al.; 5,009,695 to Kuster et al.; and, 5,078,776 to Kajii et al. These systems generally illustrate a plurality of apertures formed in or extending from metal surfaces configured to the desired cross-sectional shape of the sheet. The sheets are floated on the individual jet streams emanating from the apertures, i.e., orifices. For reasons discussed in the Detailed Description that follows, it is not desired to use a plurality of jet orifices to transfer the glass sheets.

SUMMARY OF THE INVENTION

Accordingly, it is a principal object of the present invention to provide a gas flotation system for transporting glass sheets, for example, from one station to another in a glass processing system.

This object along with other features of the invention is achieved in a transfer station for conveying glass sheets traveling in a given direction. The transfer station includes a plurality of pressure pads with each pad having a pair of longitudinally-extending slot nozzles transversely spaced from each other by a baffle plate. The slot nozzles are angled to oppose one another and the baffle plate provides a static surface area supporting the overlying sheet surfaces whereby the glass sheets are supported in the transfer station. Significantly, the static pressure area provides a heat transfer area to maintain the glass sheets at a desired uniform temperature by controlling the temperature of the gases in a plenum directing a gas under pressure at a set temperature to the pressure pads.

In accordance with another aspect of the invention, the travel of the glass sheets are in a longitudinal direction. Particularly, when the invention is used to float thin glass sheets or sheets that are to be formed, the direction of flow of the glass sheets is along a longitudinal work flow axis. The slotted nozzles are parallel one another and generally aligned with, but at an angle to the longitudinally-extending work flow axis so that any specific glass surface area is not constantly exposed to jet impingement as the glass sheets travel through the glass processing system. Constant gas impingement of any surface area has the potential for optically distorting the glass sheet, which could become significant for thin glass sheets.

In accordance with an important aspect of the invention, at least certain pressure pads have an angled edge transversely extending jet nozzle adjacent their longitudinal ends so that the gas emanating from the edge jet nozzle is effective to transition the glass sheets onto and off of the pressure pads in a stable manner and without the leading edge of the glass sheets wobbling or dropping downward to possibly scrape the pressure pad.

In accordance with a particularly important feature of the invention, each pad is sized and transversely positioned relative to an adjacent pad to eliminate any open space between adjacent pressure pads so as to prevent exhaust of gas discharged through the slotted nozzles passing between adjacent pressure pads whereby the pressure profile in the transverse direction of the transfer station can be controlled while the pressure profile along the longitudinal axis is constant vis-a-vis the slotted nozzle, pressure pad geometry.

In accordance with another aspect of the invention, the transfer station includes a longitudinally and transversely extending spacer baffle positioned between adjacent pressure pads which permits optimization of pad design for any particular transfer station to obtain a desired flotation height with minimal gas pressure while providing uniform support over the entire sheet surface so that neither the shape of the glass sheet nor its dimensions are adversely affected.

In accordance with another aspect of the invention, a valved control arrangement is utilized to permit rapid on/off pressurization of the pressure pads while maintaining the pressure pad air at set and constant temperatures notwithstanding the rapid on/off cycles.

It is thus a general object of the invention to provide a pressure pad arrangement for conveying discrete strips of thin material, whether sheets of glass or ferrous, or non-ferrous or non-metallic fibrous or non-fibrous materials, all in a stable, non-distorting manner.

It is a particularly important object of the invention to provide a pressure pad flotation system for conveying glass sheets in a glass forming process even when the glass sheets are in a semi-viscous, easily deformable state without deformation of the glass sheets.

It is another important object of the invention to provide a pressure pad flotation system for conveying thin glass sheets (in a thickness range as low as about 1.6 to 2.6 mm and lower) which can be conveyed in a flat condition while being maintained at a set temperature to permit the glass sheet to be formed in a set, three dimensional configuration in a press forming station.

Yet another object of the invention is to provide a pressure pad arrangement which (floats and promotes) temperature uniformity within thin and flat glass sheets to permit the glass sheets to be formed into three dimensional configurations which are otherwise difficult, if at all possible, to achieve in current press bending stations.

It is another object of the invention to provide a mechanism for conveying heated glass sheets in an optical non-distorting manner anywhere within a glass processing line including the conveyance of the sheets through the heating furnace.

Yet another important and specific object of the invention is to provide a mechanism for transporting heated glass sheets from a glass heating furnace to a female ring mold in a press bending station without optically distorting or marking the glass sheet.

In accordance with the immediately preceding object, a still further object of the invention is to provide a transport mechanism which maintains the glass sheet substantially at about its furnace temperature to obviate any need to prebend the glass sheet prior to entering the press bending station.

A still further and specific object of the invention is to provide a transfer mechanism for flat glass sheets from the furnace to the press bending station which is able to maintain thinner glass sheets in a flat, undistorted condition by means of a pressure pad arrangement which maintains a uniform pressure over the entire width of the sheet while transferring the sheet without vertical oscillations or constant jet stream impingement of any specific glass area.

Still another object of the invention is to provide a control arrangement for pressurizing and depressurizing the pressure pads during a glass bending cycle which is automatically set for any given glass sheet size and easily adjustable to achieve desired flotation height.

Yet another object of the invention is to provide a gas pressure system for conveying objects which uses a minimal quantity of gas (air) to support the object thus reducing energy requirements of the system to less than what otherwise may be required.

A general object of the invention is to provide a pressure pad array for stably conveying sheets of material by developing a gas flotation planar area which has a generally uniform pressure profile along the x and y axes of the planar area.

These and other features, objects and advantages of the present invention will become apparent to those skilled in the art upon reading and understanding the detailed description of the invention set forth below taken in conjunction with the drawings hereof.

BRIEF DESCRIPTION OF THE DRAWINGS

The invention may take form in certain parts and an arrangement of parts taken together and in conjunction with the attached drawings which form a part hereof and wherein.

DETAILED DESCRIPTION OF THE PREFERRED EMBODIMENT

Figure 1:
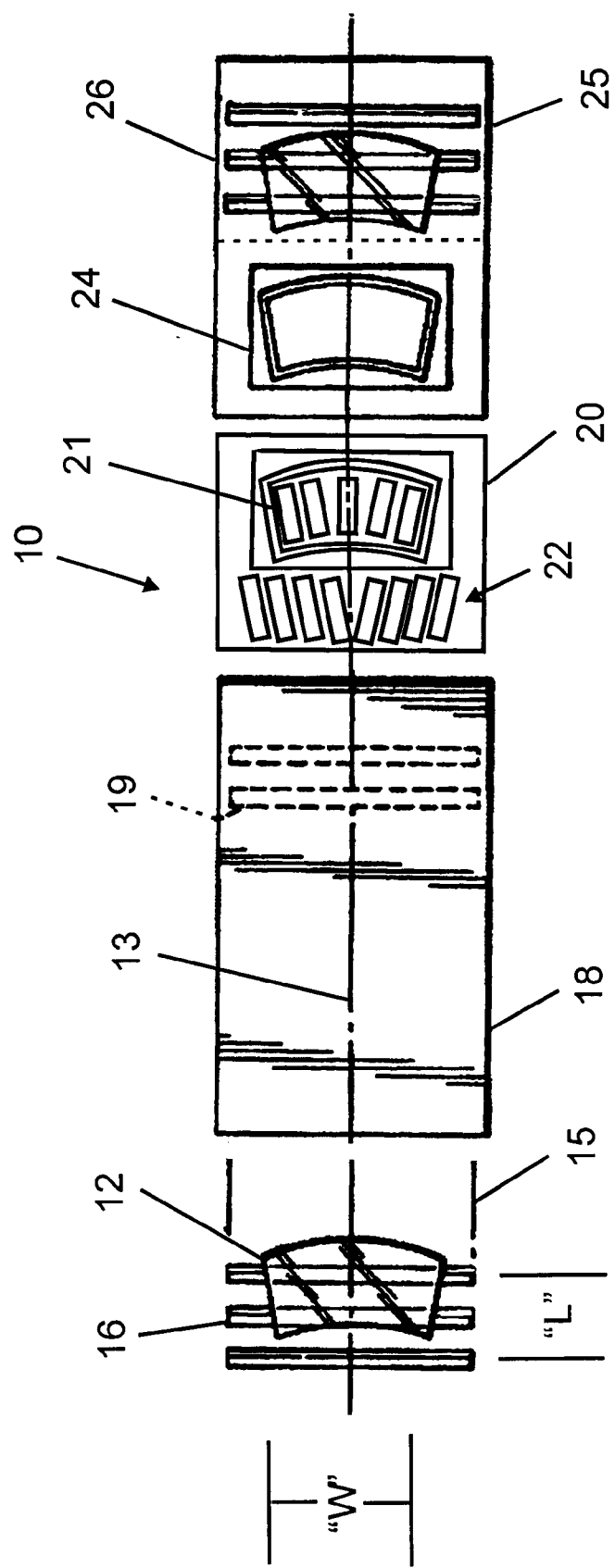
FIG. 1 is a schematic, overall plan view of a glass shaping system.

Referring now to the drawings wherein the showings are for the purpose of illustrating a preferred embodiment of the invention only, and not for the purpose of limiting same, there is shown in FIG. 1 a press bending and tempering apparatus or glass forming line 10. Work articles in the form of flat glass sheets 12 are conveyed in a horizontal plane along a longitudinally-extending work axis 13 through press glass shaping system line 10. For orientation purposes, glass sheets 12 have a length, "L" extending parallel to longitudinal work axis 13 and an orthogonal, transversely extending width, "W". In the preferred embodiment, glass sheets 12 are shown in the form of an automotive windshield although other glass articles and shapes can be used in the preferred embodiment, and, in accordance with the broader aspects of the invention, work pieces other than glass, such as steel or web sheets, can be utilized in the invention. A windshield is shown because it requires special handling when heated if it is to be bent in three planes with little if any optical distortion.

As shown in FIG. 1, a conveyor station 15 utilizing conventional, ceramic conveyor rolls 19 sequentially transports, in serial fashion, a number of glass sheets 12 to the entrance of the furnace 18. The glass sheets are serially transported through furnace 18 by ceramic conveyor rolls 19 (or at the exit end of the furnace by specially constructed, fabric covered rolls of the type described in the Background section above). The glass sheets are heated in furnace 18 to their shaping temperature and discharged by conveyor rolls 19 into a press bending station 20. Press bending station 20 includes a press 21 for bending heated flat glass sheet 12 into the windshield form and a pressure pad transfer station 22 for transporting heated glass sheets into press 21. The bent glass sheets or sheets are then transferred to a controlled cooling station 24 where they are cooled to a slightly lower temperature and then to an unloading station 25 driven by conventional rollers 26. It is to be appreciated that press bending and tempering line 10 is described only in its general functional terms. Sophisticated drives and shuttle mechanisms are employed throughout the line to serially process the glass sheets at very high speeds. Reference can be had to the several patents incorporated by reference for a further description of some of the components of a glass processing system 10 similar to that which will be described in detail herein. The general explanation of the line given is believed sufficient to provide an understanding of the present invention. However, it is to be noted that wherever the drive roll conveyors have been discussed with reference to FIG. 1, a pressure pad array employing the concepts of the subject invention can be employed in place thereof. Particularly, the pressure pad arrangement of the subject invention can be employed in place of the specially fabricated rolls 19 in furnace 18. As glass sheets 12 are heated in furnace 18 to their glass shaping temperature, they become increasingly subject to optical distortion resulting from contact with conveyor rolls 19 irrespective of the roll covering. This is especially critical when the glass sheets are very thin. The thinner the glass, the more likely that optical distortions will occur from surface contact.

As a matter of definition, the invention in its broader scope is not limited to glass sheets. Glass sheets, however, have certain characteristics which set them apart from other articles that could be conveyed by the flotation system of the present invention especially when conveyed in a glass processing/forming line. Among the characteristics is the temperature ranges at which glass transitions between its various state phases because the glass is typically at or near a plastic phase at which it is particularly susceptible to marking and/or optical distortion during movement. Thus, the invention in accordance with a specific scope thereof has particular uniqueness for transporting heated glass sheets because of the unique requirements imposed on the system by the heated sheets. A still more specific inventive scope is a flotation system for a glass processing line where the glass sheets exit a furnace and enter a glass shaping station in that temperature uniformity at a set range is to be maintained in the glass sheets to permit optimum shaping of the sheet. The glass temperature exiting the furnace is typically about 1200° F. and the glass sheets are defined herein as "plastic" or deformable within that temperature and more specifically, within the temperature ranges of about 950–1250° F. Additionally and irrespective of the use of the floatation system of the present invention in other transfer stations within a glass shaping system, the glass sheets, when heated to a semi-viscous, easily deformable condition for transfer to a press bending mold, are conveyed as flat sheets for optimum and consistent bending within the press.

Figure 2:
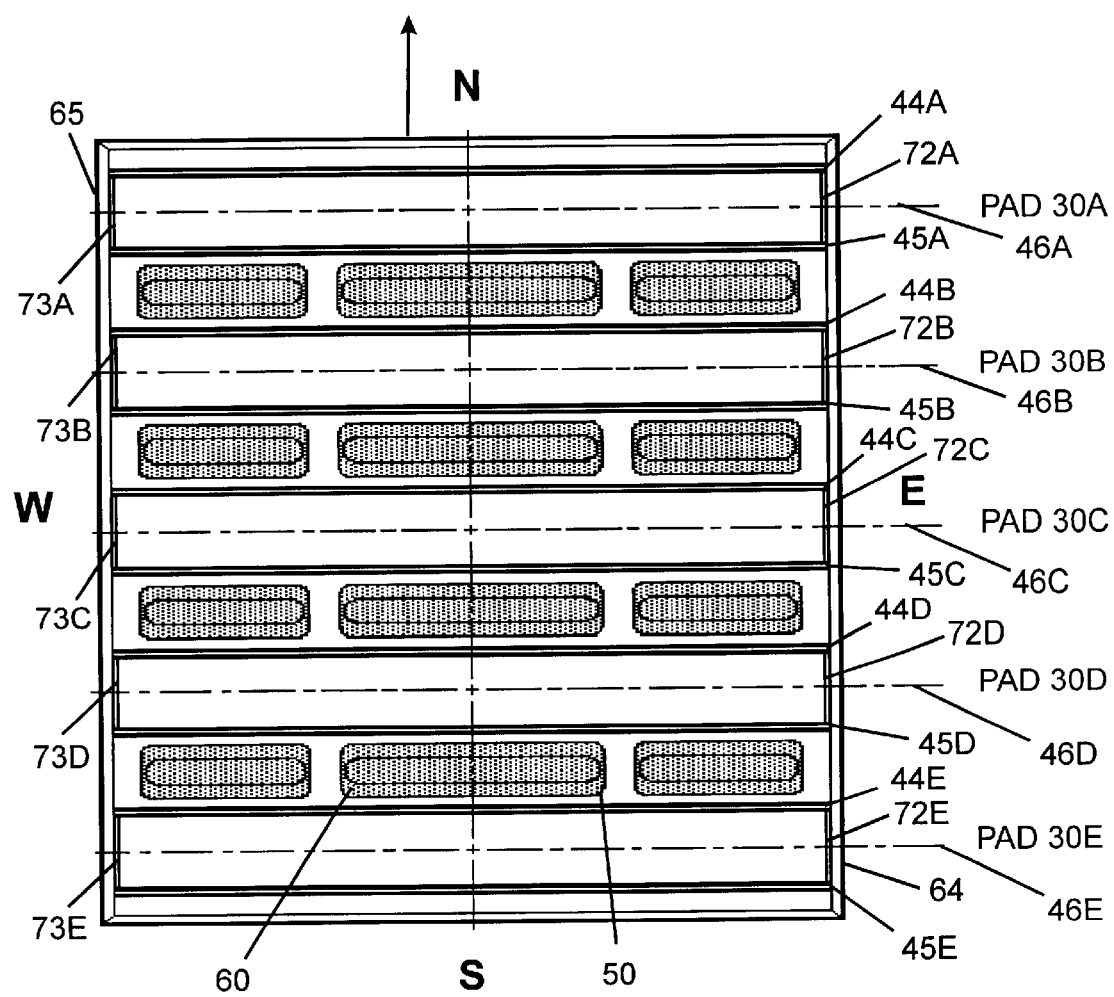
FIG. 2 is a plan view of a bench test unit pressure pad configuration used to verify the inventive concepts of the subject application.
Figure 3:
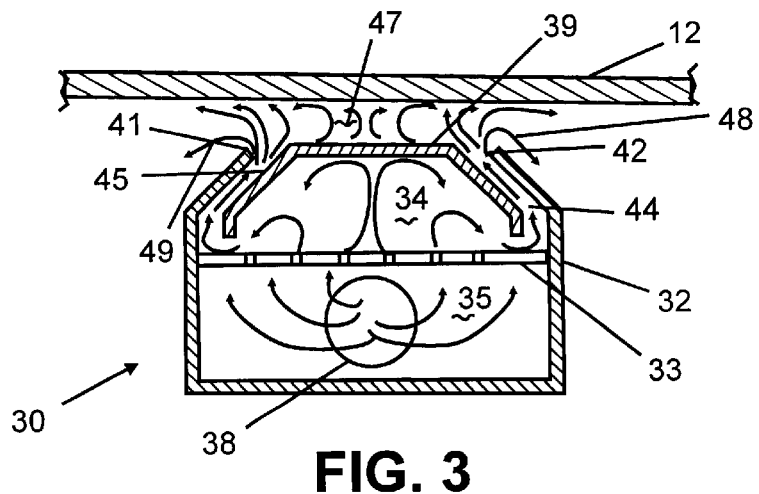
FIG. 3 is a cross-sectional view of a pressure pad supporting a glass sheet.

Referring now to FIGS. 2 and 3, there is shown a cross sectional configuration of a pressure pad 30 in FIG. 3 and an arrangement of pressure pads 30a–30e in a bench test unit in FIG. 2 which pressure pad configuration was used to verify certain inventive aspects of the present invention. Pressure pad 30 has a pressure pad housing 32 which is divided by a perforated plate 33 into an upper jet forming chamber 34 and a lower distribution chamber 35. Gas, typically heated air, is pumped into lower distribution chamber 35 through a plenum opening 38 and is forced through the perforations in perforated plate 33 into upper jet forming chamber 34. Perforated plate 33 assures even flow distribution of the gas into upper jet forming chamber 34 throughout the length of pressure pad 30 (and this, in turn, produces even pressure throughout the length of the slotted nozzles). Situated in the middle portion of the upper end of jet forming chamber 34 is a baffle plate segment 39. Baffle plate segment 39 spans but is spaced from a top opening in pressure pad housing existing between side margin edges 41,42 of pressure pad housing 32 and baffle plate segment. Specifically, baffle plate segment 39 and the sides of pressure pad housing 32 form right and left hand slotted jet nozzles 44, 45 respectively with side margin edges 41, 42. Slotted nozzles 44, 45 are angled, as shown, to oppose one another and create a static pressure zone indicated by reference numeral 47 between slotted jets 44, 45, baffle plate segment 39 and glass sheet 12. Static pressure zone 47 floats glass sheet 12 on a cushion of gas. Note, baffle plate segment 39 is that part of pressure pad 30 which is closest to glass sheet 12.

The structure of pressure pad 30 described in FIG. 3 is entirely conventional and reference to the '329 patent can be had for a further description. In the preferred embodiment, slotted nozzles 44, 45 are angled preferably at 45 relative to vertical. Free-standing jets having flow velocities of 10,000 ft/min can be readily formed in slotted nozzles 44, 45 of conventional pressure pads. In the preferred embodiment, high jet pressures are desired to be avoided. Nozzle velocities of about 2,500 ft/min to about 5,000 ft/min and static pressures in static pressure area 47 of about 0.5 in w.c. (inches of water column) to about 1.5 in w.c. are preferred when floating glass strip having thicknesses between about 1.5 to about 4 mm. As a point of reference, turbulent flow will occur with jet speeds of 10,000 ft/minute. At velocities of 2,500 to 5,800 ft/minute the jet is transitioning from laminar to turbulent flow. Turbulent flow is to be avoided for suspending glass sheets in this invention, especially when the glass sheets are heated to a plastic condition.

Again, the pressure pad configuration illustrated in FIG. 3 is well known, and, it is to be understood that this invention is not limited to any specific pressure pad configuration or design. Several of the pad configurations shown in the '329 patent may be used in the present invention. Typically, pressure pad systems, when used for floating aluminum strip and like material, place a pressure pad beneath the strip and an opposing pressure pad above the strip such as shown in FIG. 1 of the '329 patent. It is believed that there have been instances when floating heavy gauge steel strip, not subject to flutter, where the pressure pads were situated only beneath the strip. However, in all applications, the pressure pads are believed transversely aligned to the strip at spaced increments. More specifically, viewing FIG. 3, in conventional pressure pad arrangements the strip travel will be from right to left or left to right and when viewing FIG. 2, the strip travel will be in the designated south to north or north to south direction. In the present invention, the pressure pads are preferably aligned so that the slotted nozzles extend generally in the direction of work travel axis 13. That is, with respect to FIG. 2, glass sheets 12 travel into and out of the plane of the page and with respect to FIG. 2, glass sheets 12 travel in the designated east to west or west to east direction. In general summary, the longitudinal axis of the pressure pads designated by reference numeral 46 is generally aligned with the longitudinal direction of travel of the work, i.e., axis 13.

It should be noted that in the typical pressure pad application, continuous strip lines (whether metal or web) are floated by the pressure pads directing hot gas in heat transfer relationship with the strip. The strip must be supported from one width edge to the other width edge to prevent flutter and also to assure uniform heat transfer throughout the width of the strip. However, it was discovered that when the glass sheets were supported with the pressure pad's longitudinal axis 45 transverse to the direction of flow of glass sheets 12, the sheets would not float stably. In fact, the sheet's leading edges would bounce or skip after they passed a pressure pad and sporadically contacted the pressure pad no matter what gas pressures were developed through the slotted nozzles 44, 45. When pressure pads 30 were oriented with pad axis 46 aligned with work flow axis 13, the sheets 12 did not contact the pressure pad.

Conventional practice in known pressure pad applications is to provide an exhaust path for the spent gas jets to travel after building static pressure area 47. This is diagrammatically illustrated in FIG. 3 by the arrowhead gas streamers drawn. For example, gas streamers designated by reference numerals 48, 49 show the spent gas traveling down the outside side portions of pressure pad housing 32. The exhaust path is illustrated in FIG. 2 by the lines containing the shaded area designated by reference numeral 50 between adjacent pads. The shaded area represents a spacer baffle 60 blocking what would otherwise be a conventional open exhaust (i.e., exhaust path 50) between adjacent pressure pads 30.

In the preferred embodiment of the present invention, spacer baffles 60 are provided between adjacent pressure pads 30. The effect of adding spacer baffles 60 may be best explained by reference to the pressure distribution graphs of FIGS. 4 and 5 taken together with the cross-sectional orientation of the pressure pad aligned with the x-axis of the graphs.

Figure 4:
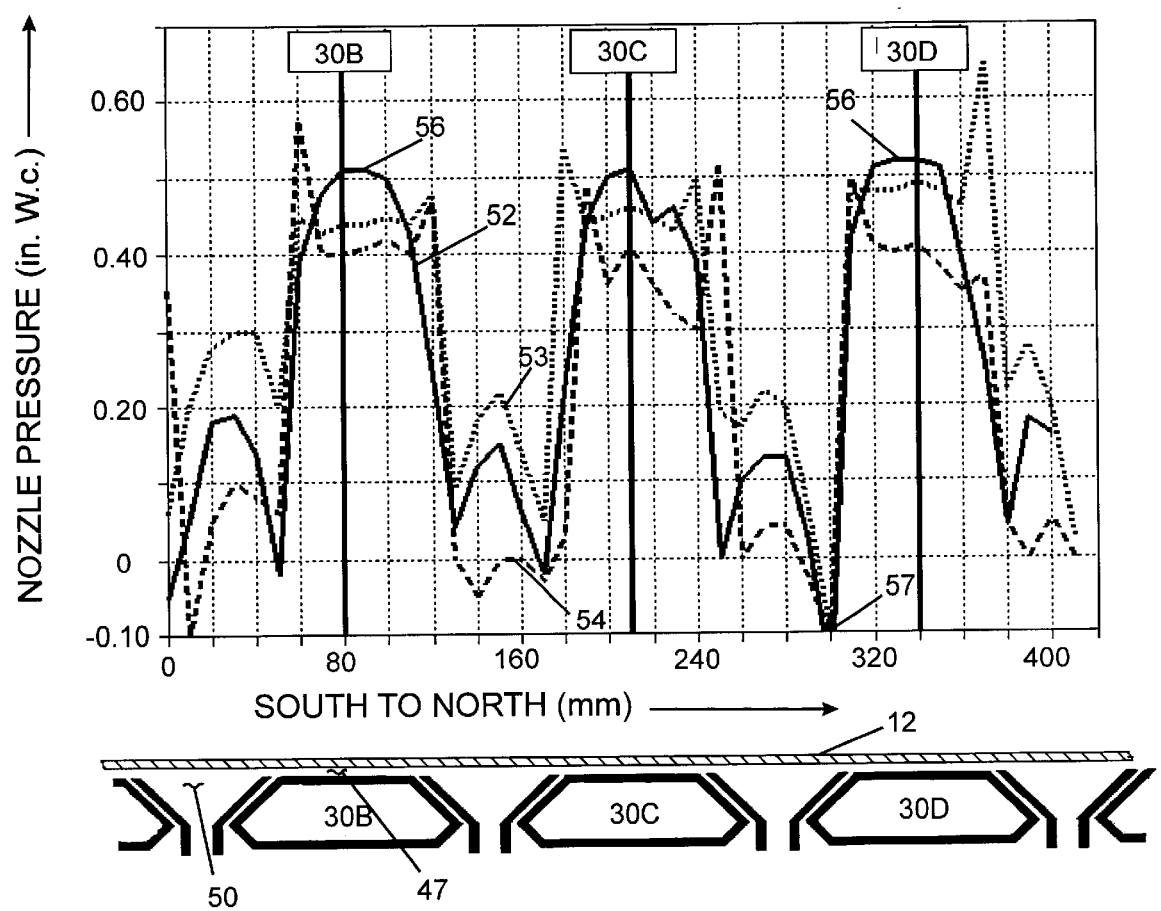
FIG. 4 is a chart of nozzle pressure exerted on a glass sheet floated on the pressure pad arrangement of FIG. 2 for the pressure pad configuration schematically illustrated in cross section beneath the graph.

Referring first to FIG. 4, there is shown a graph plotting nozzle pressure in inches of water column on the y-axis and a portion of the south-to-north distance of the bench unit's pad arrangement shown in FIG. 2. Recall that glass sheets 12 are traveling in an east-west direction so that the traces plotted in FIG. 4 shows gas pressure exerted along the width "W" of glass sheet 12. Aligned with the horizontal x-axis of the FIG. 4 graph are selected pressure pads of the bench unit shown in partial cross-section. Specifically pressure pads 30b, 30c, and 30d are plotted at the distances they span on the north-south axis of FIG. 2.

The pressure pad profiles shown in FIG. 4 were developed by floating a sheet of plexiglass on the bench test pressure pad configuration shown in FIG. 2. The plexiglass sheet was larger than the bench test unit of FIG. 2. In other words, the plexiglass sheet was oversized relative to the pressure pads in the bench test unit. The plexiglass sheet was suspended about 6 mm above the face of the pressure pads by adjusting the gas flow in the pressure pads to simulate the nozzle pressure required to float a glass sheet of thickness about 2.6 mm. The pressure at the underside of the plexiglass sheet was measured through a ⅛" diameter hole in the center of the sheet whereat a pressure tap was made with an inclined manometer fastened with surgical tubing. The sheet was centered over the bench unit so that the pressure tap was initially at the intersection of the north-south and east-west axis as shown. The sheet was then moved along a north-south axis and pressure tap measurements taken at every 10 mm to generate the solid trace shown by reference numeral 52 in FIG. 4. A pressure tap was then placed 3½" east of the mid-point position and north-south measurements were again taken at 10 mm increments to generate the pressure pad profile shown by the dashed trace designated by reference numeral 53. A tap was then placed 6" east of the sheet's mid-point position and the north-south pressure pad profile shown by heavy dash trace indicated by reference numeral 54 was generated.

Several conclusions were drawn from the pressure pad tests depicted in FIG. 4. First, the north-south pressure pad profile at any east-west position will be similar throughout the pressure pad arrangement of FIG. 2. This is consistent with other tests (not shown) of the pressure pad profile taken in the east-west direction over the center face portions of the individual pressure pads. Those tests showed a generally constant pressure along the longitudinal axis 46 of each pad. This is also consistent with pressure pad theory which develops fairly constant slot jet pressures which extends the length of the slots. Second, a fairly constant pressure was developed over the static pressure area 47 such as shown by reference numeral 56 for the center profile trace 52. This constant pressure was expected to occur and is consistent with the pressure pad theory of operation as discussed above. Third, the magnitude of the pressure drop as the spent gas exited the system through exhaust path 50 was not expected. More specifically, even though the exhaust path 50 was open to atmosphere, the pressure traces show a negative pressure such as indicated by reference numeral 57 for center trace 52. A negative pressure was not expected to occur and it was concluded that the negative pressure contributed or caused the unevenness observed in the glass sheet when traveling in the east-west direction. FIG. 4 also shows rather dramatically what happens if the sheets traveled in the south-to-north or north-to-south direction. In that instance, the bench test unit of FIG. 2 would replicate somewhat conventional pressure pad placement orientation. The under pressure areas, i.e., 57, would pull the sheet down. As noted, when the sheets were floated in the north-to-south direction, the leading edge bounced and since the under pressure varied, the leading edge of the sheet when floated in the south-north direction could contact baffle plate segment 39 rendering the sheet useless. While simply orientating the sheet travel to be parallel to pressure pad longitudinal centerline 46 may be acceptable, in and of itself, for floating thick glass sheets, such an arrangement still has the under pressure zones or areas 57 which do not result in stable flotation of thin glass sheets.

Figure 5:
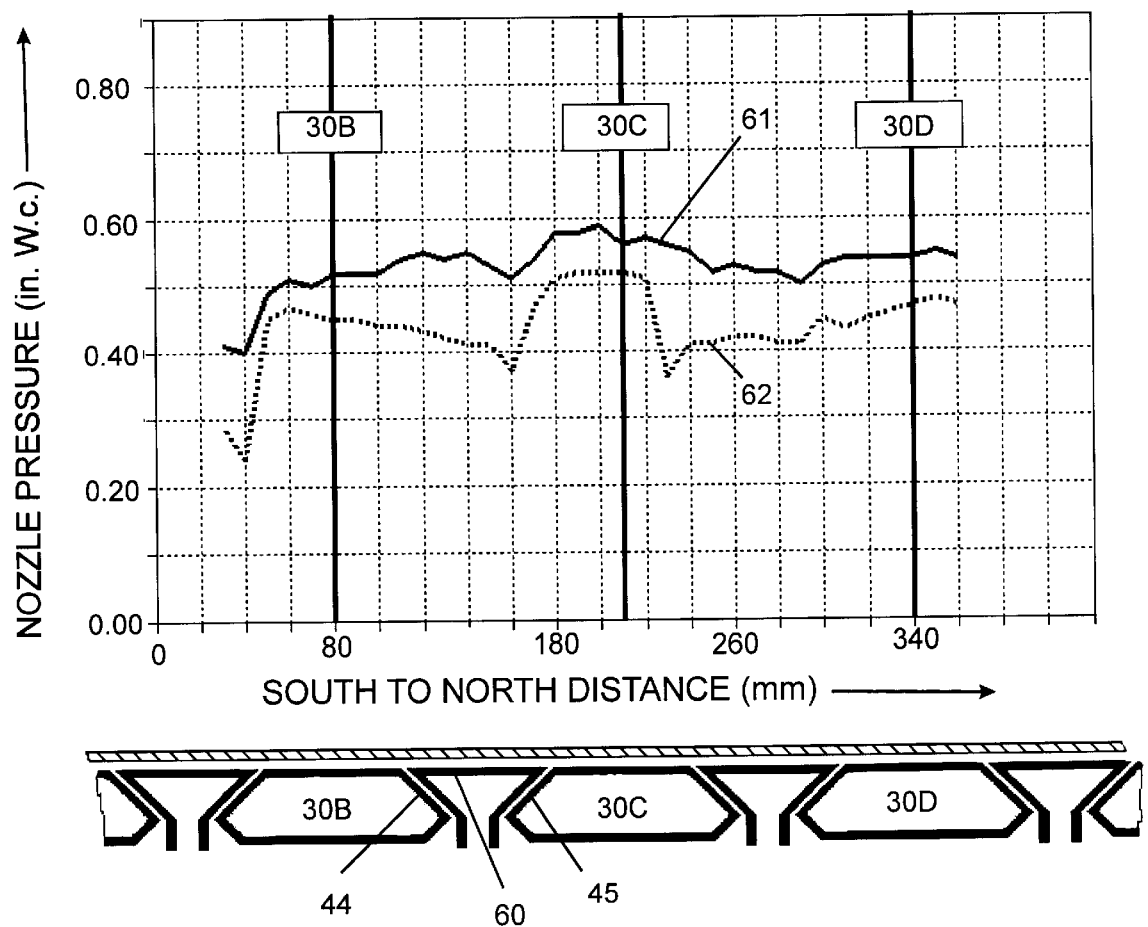
FIG. 5 is a graph similar to FIG. 4 but showing the pressure profile beneath the glass sheet for the pressure pad configuration shown beneath the graph.

Referring now to FIG. 5, there is shown pressure pad profile traces with a modification to the pressure pad arrangement illustrated in FIG. 4. That modification which forms one of the important aspects of the present invention is the inclusion of a spacer baffle 60 which extends between right and left hand nozzle jets 44, 45 of adjacent pressure pads 30 to seal and prevent gas from escaping through exhaust path 50. Spacer baffle 60 is diagrammatically shown by the shaded area overlying return path 50 in FIG. 2. With exhaust path 50 closed, gas exhausted through slotted jets 44, 45 escapes by passing underneath glass sheet 12 and out from around the edges thereof. With this arrangement, a pressure tap centered in the middle of the sheet and the plexiglass positioned at the center of the pressure pad arrangement shown in FIG. 2 and incrementally moved (as described for FIG. 4) in the north-south direction, generated a pressure pad profile shown by the solid trace indicated by reference numeral 61. With the pressure tap moved 100 mm east of the sheet center, a pressure pad profile designated by dash lines 62 was developed and resembles somewhat the center pressure pad profile 61. The conclusion that can be drawn from FIG. 5 compared to FIG. 4 should by now be obvious. The inclusion of spacer baffles 60 produces a stable pressure profile for floating glass sheet 12 in a direction generally transverse to the direction of travel of glass sheet 12 (i.e., north/south direction). As previously noted, the pressure pads produce a uniform pressure profile along their longitudinal axis 46, i.e., east/west direction. Thus, the invention achieves generally uniform gas pressures over the entire glass sheet area to stably support the sheet.

By closing return path 50, there are created additional static pressure areas, designated 47' between glass sheet 12, spacer baffle 60, the right hand slot jet nozzle 44 of one pressure pad 30 and the left hand slot jet nozzle 45 of an adjacent pressure pad. Because the slot jet pressures are generally constant along their length, the additional static pressure areas 47', created in large part by a portion of the gas discharged through the slot jet nozzles, should also be uniform along the length of the pressure pads. This is somewhat verified by comparing corresponding points in traces 61, 62 of FIG. 5 representing 2 different longitudinal distances over the width of spacer baffles 60. Thus the plurality of longitudinally-extending pressure pads create a plurality of longitudinally-extending static pressure areas, closely spaced to one another, having generally constant pressures at any point in the static pressure area.

Referring still to the bench test unit of FIG. 2, each pressure pad 30 has longitudinal ends, one of which can be termed a leading longitudinal end 64 and the opposite can be termed a trailing longitudinal end 65. The glass sheets enter the arrangement at leading longitudinal end 64 and exit at trailing longitudinal end 65.

Figure 6:
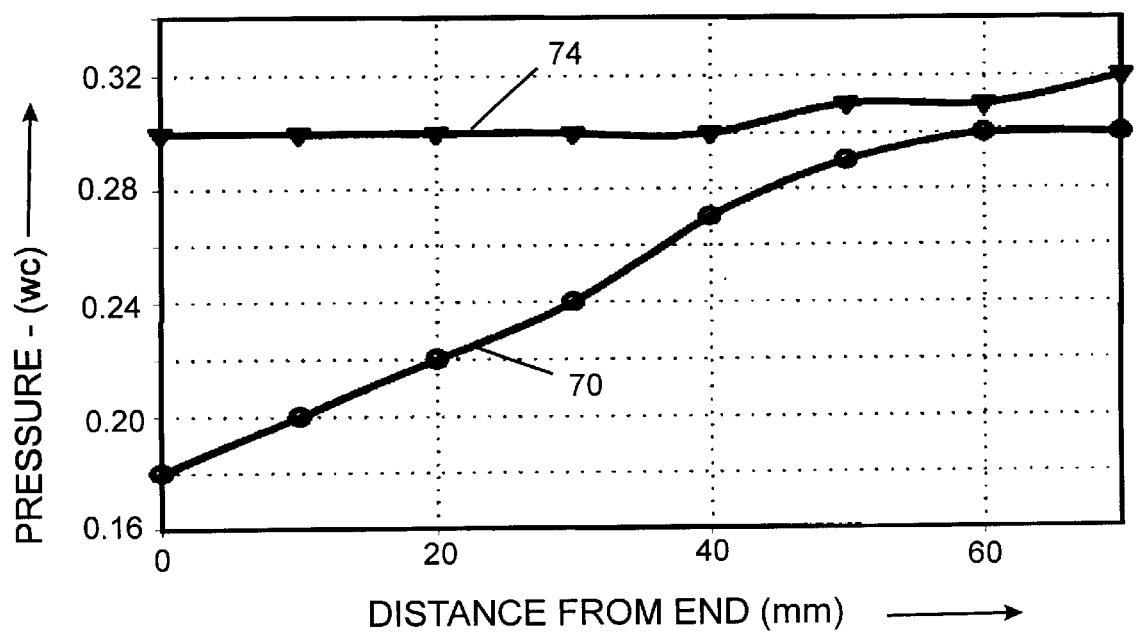
FIG. 6 is a graph of the pressure supporting the glass sheet at the edge configuration of the pressure pad arrangement with and without the addition of a side jet.
Figure 7:
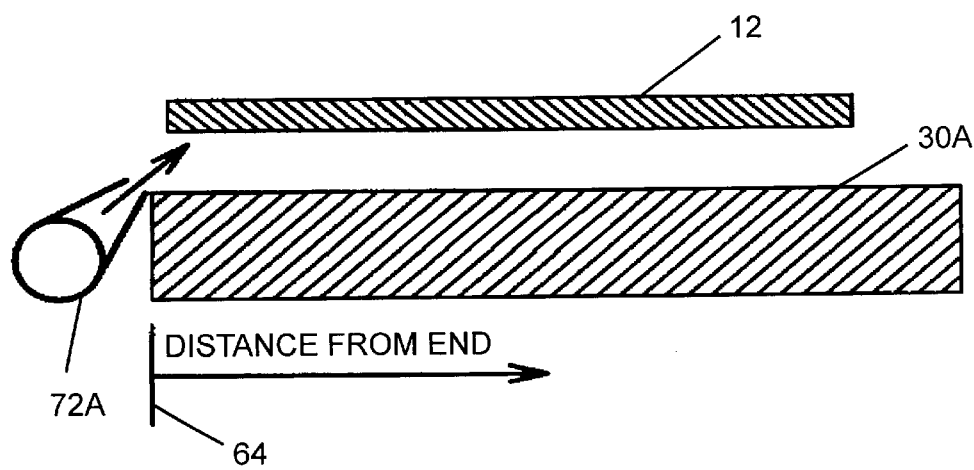
FIG. 7 is a schematic illustration of the side jet discussed with reference to the graph of FIG. 6.

Referring now to FIGS. 6 and 7, there is shown in FIG. 6 a graph with trace 70 passing through circles indicated by reference numeral 70 showing the pressure, in inches of water column, existing at leading longitudinal end 64 or trailing longitudinal end 65 of the pressure pad array. This pressure decline near the longitudinal ends of a pressure pad could cause scraping of the plate as the plate's leading end passes over the pressure pad area with less pressure. To alleviate this condition an edge jet is positioned at each of the pressure pads longitudinal ends 64, 65. The addition of an edge jet has the effect of raising the pressure profile at the longitudinal ends of the pressure pad as shown by the trace passing through triangles indicated by reference numeral 74 in FIG. 6. This is schematically shown in FIG. 7 by leading edge jet 72 positioned adjacent leading longitudinal end 64 of a pressure pad. Thus, as shown in FIG. 2, each pressure pad 46A–46E has a leading edge jet 72A through 72E adjacent longitudinal leading end 64 and a trailing edge jet 73A through 73E adjacent longitudinal trailing end 65. Besides preventing the leading edge of the plate from dropping down and possibly contacting the pressure pad as the sheet passes over the longitudinal leading and trailing ends 64, 65, edge jets 72, 73 provide a smooth transition as the plates travel from one pressure pad array to another pressure pad array. Edge jets 72, 73 in effect produce a slotted jet which extends about the periphery or circumscribes the pressure pad, and form another important aspect of the invention.

Figure 8:
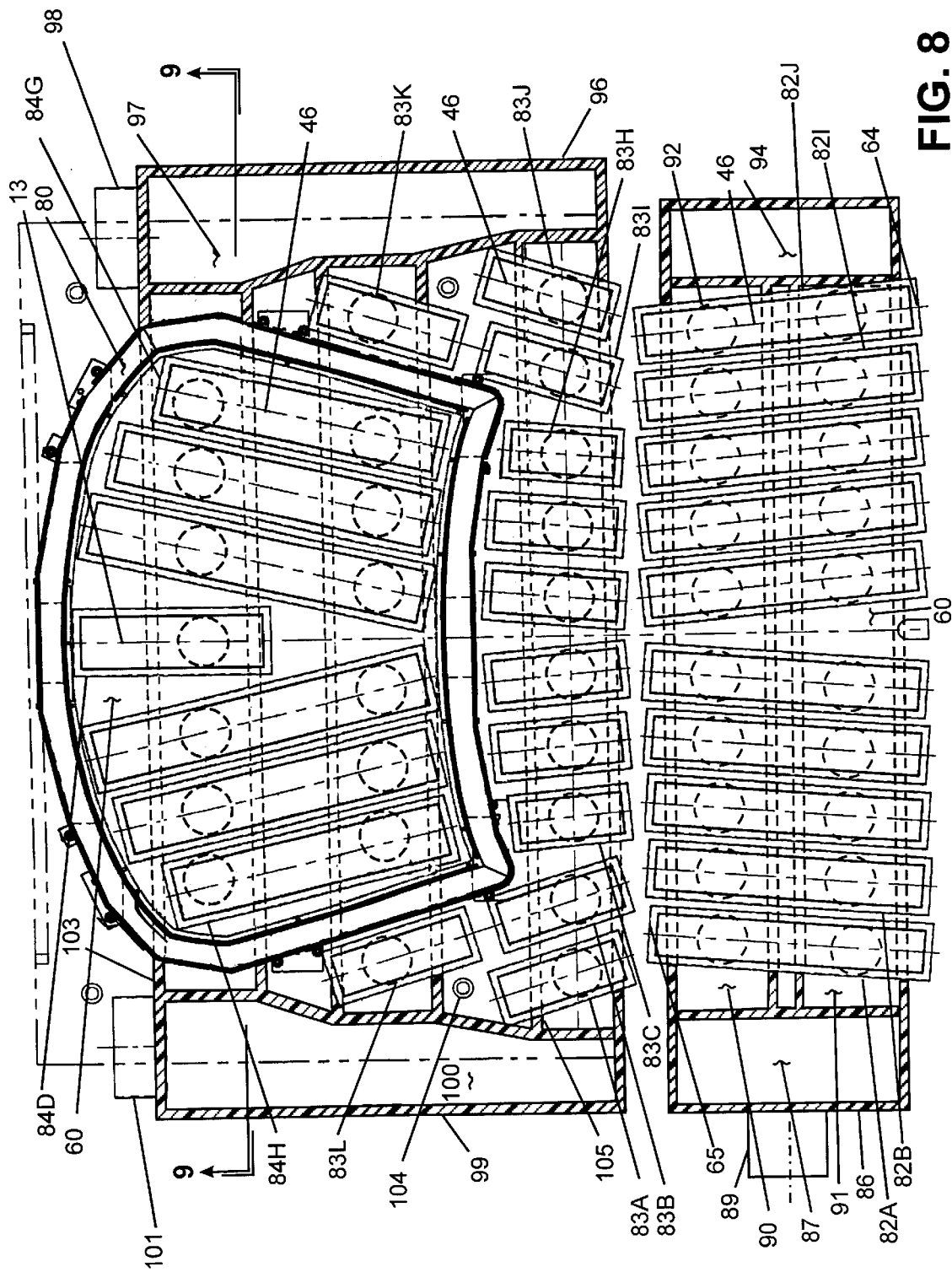
FIG. 8 is a plan view of the pressure pad configuration of the present invention employed in the press bending station transferring the glass sheets from the furnace to the female ring mold.

Referring now to FIG. 8 there is shown a cross-sectioned, schematic plan view of a portion of press bending station 20 which contains a female ring mold 80 that, in the preferred embodiment, is stationary. Within press bending station 20 is a plurality of pressure pads which have the configuration described with reference to FIG. 3. For definitional purposes, the plurality of pressure pads are arranged in an array and in the preferred embodiment the plurality of pressure pads is further defined or divided into a first plurality of dumper pads 82 arranged in a dumper pad array, a second plurality of pre-ring pads 83 arranged in a pre-ring array and a third plurality of ring pads 84 arranged in a ring pad array. In the preferred embodiment of FIG. 8, there are 10 dumper pads designated 82a through 82j. There are 12 pre-ring pads designated 83a through 83l. There are seven ring pads designated 84a through 84g. All arrays of pressure pads 82, 83 and 84 can be viewed as a transfer station. Alternatively, the array of dumper pads 82 can be viewed as a transfer station, per se, and the array of pre-ring and ring pressure pads 83, 84 can be viewed as a flotation system for supporting glass sheets 12 in a press bending mold. It is important to note that each of the pressure pad arrays, i.e., dumper pressure pads 82, pre-ring pressure pads and ring pressure pads 84, is different than the pressure pad array illustrated in the bench scale press unit shown in FIG. 2 in that the longitudinally-extending centerlines 46 of each pressure pad 82, 83 and 84 (with the exception of pressure pad 84d) are inclined at an angle relative to work flow longitudinal centerline 13. In each case, longitudinally-extending centerline 46 of the pressure pad makes an angle with the longitudinal work flow axis 13. It should also be noted that each plurality of pressure pads are orientated to either converge towards the work flow longitudinal centerline 13 or diverge from work flow longitudinal axis 13. That is, half the pressure pads form an acute angle with work longitudinal centerline 13 at one side thereof while the other half form an acute angle on the opposite side of centerline 13. Dumper pressure pads 82 converge towards work flow axis 13 while pre-ring pads 83 and ring pads 84 diverge from work flow axis 13. This is believed to produce a stable array of pressure pads for the transfer station disclosed. Other configurations will suggest themselves to those skilled in the art.

When the pads are angled, any particular spot on the glass sheet which is directly impinged by gas emanating from slotted jet nozzles 44, 45 is not impinged once the plate moves an incremental longitudinal distance. No specific area of the glass sheet is constantly exposed to impingement by nozzle jets 44, 45. During the bench tests, it was observed that the jet streams could be observed to actually form a continuous line where the gas struck the underside of the plate as the plate moved parallel to the pressure pad. Because the plates are thin, it is possible that optical distortion lines could be induced from the nozzle jets. Canting the pressure pad relative to the direction of sheet travel avoids any jet impingement line from forming. In this regard, there are several important points that should be noted. First, it was surprising to note that the impact of the jet stream in the pressure pad arrangement design of FIG. 3 is at all present. This is because slotted jets 44, 45 are angled towards one another to form the static under pressure zone 47. That is, because the jets are angled, the force of the jet directly impinging the glass surface is only a fraction of its impingement force and the presence or the formation of the static pressure zone creates a gas flow wiping across the underside of the plate, further diminishing whatever impingement the jets make against the glass underside surface. Secondly, the slotted jets are not producing free standing jets. As already noted, the air flow through the nozzles is not at a pressure sufficient to cause turbulent flow. In short, if the glass sheets remained stationary, the presence of any streamers resulting from jet impingement which could optically distort the glass sheet is somewhat surprising. This should be contrasted to the prior art arrangements heretofore used for floating glass and discussed or referenced in the Background section above. Those prior art arrangements comprise plates or plenum chambers situated underneath the glass having small apertures which function as nozzles or nozzle tubes vertically extending from the plenum chamber. In either instance, jet streams of gas are directed perpendicular to the underside of the plate. A plurality of apertures directing individual gas streams cannot provide the stability of a slotted nozzle nor develop the static pressure area needed to stably float the plate. Importantly, the intensity of individual free standing jets must be greater than that required for slotted jet nozzles of the present invention because individual jets do not develop static pressure area 47. Based on the bench test observations, directing individual jets against the bottom of thin plates, even with the plates moving, may very likely produce pinpoint areas of optical distortion in thin glass sheets. All of this is avoided with the pressure pad arrangement of the present invention.

Referring still to FIG. 8, it is to be understood that all adjacent pressure pads, 82, 83 and 84, have spacer baffles 60 therebetween so that all pressure pads develop a generally constant pressure profile in a transverse direction to the work flow.

The gas distribution arrangement for dumper pad(s) 82 includes a dumper pad plenum 86 defining a dumper pad plenum chamber 87 contained therein. A dumper pad inlet 89 communicates a source of pressurized gas into dumper pad plenum chamber 87. A transversely extending first dumper feeder duct 90 extends adjacent leading ends 64 of dumper pad(s) 82 and provides fluid communication from dumper pad plenum chamber 87 to each dumper pad 82a–82j through a pad inlet 92. A second dumper feeder duct 91 transversely extends adjacent trailing ends 65 of dumper pad(s) 82 and provides fluid communication from dumper pad plenum 86 to each of dumper pads 82a–82j through pad inlet 92. Dumper pad plenum 86 and first and second dumper feeder ducts 90, 91 are shown insulated, thereby maintaining the temperature of the gas discharged from dumper pad(s) 82. Not shown in FIG. 8 is a lift mechanism which can vertically raise in unison dumper pad plenum 86, first and second dumper feeder ducts 90, 91 and dumper pad(s) 82 should press bending and tempering line 10 experience a work stoppage or a break. In such instance, the dumper pad arrangement described will be raised above the discharge point of the glass sheets serially conveyed from furnace 18 so that the plates will fall by gravity into a dumper situated beneath the dumper pad arrangement for recycling. In the embodiment disclosed in FIG. 8, first and second dumper feeder ducts 90, 91 are connected at their ends (designated by reference numeral 94) opposite the ends in fluid communication with dumper plenum chamber 87 so as to assure even gas distribution through the feeder ducts. Alternatively, a second dumper plenum similar to dumper plenum 86 can be provided to supply a source of pressurized gas at the closed ends to assure an even flow balance. This is not believed necessary in the preferred embodiment. That is, the flow areas of dumper plenum chamber 87, first and second dumper feeder ducts 90, 91 and pad inlets 92 are such that the pressure and flow of the gas into the furthest removed pressure pad 82j is approximately equal to that inputted in the closest pressure pad 82a.

Figure 9:
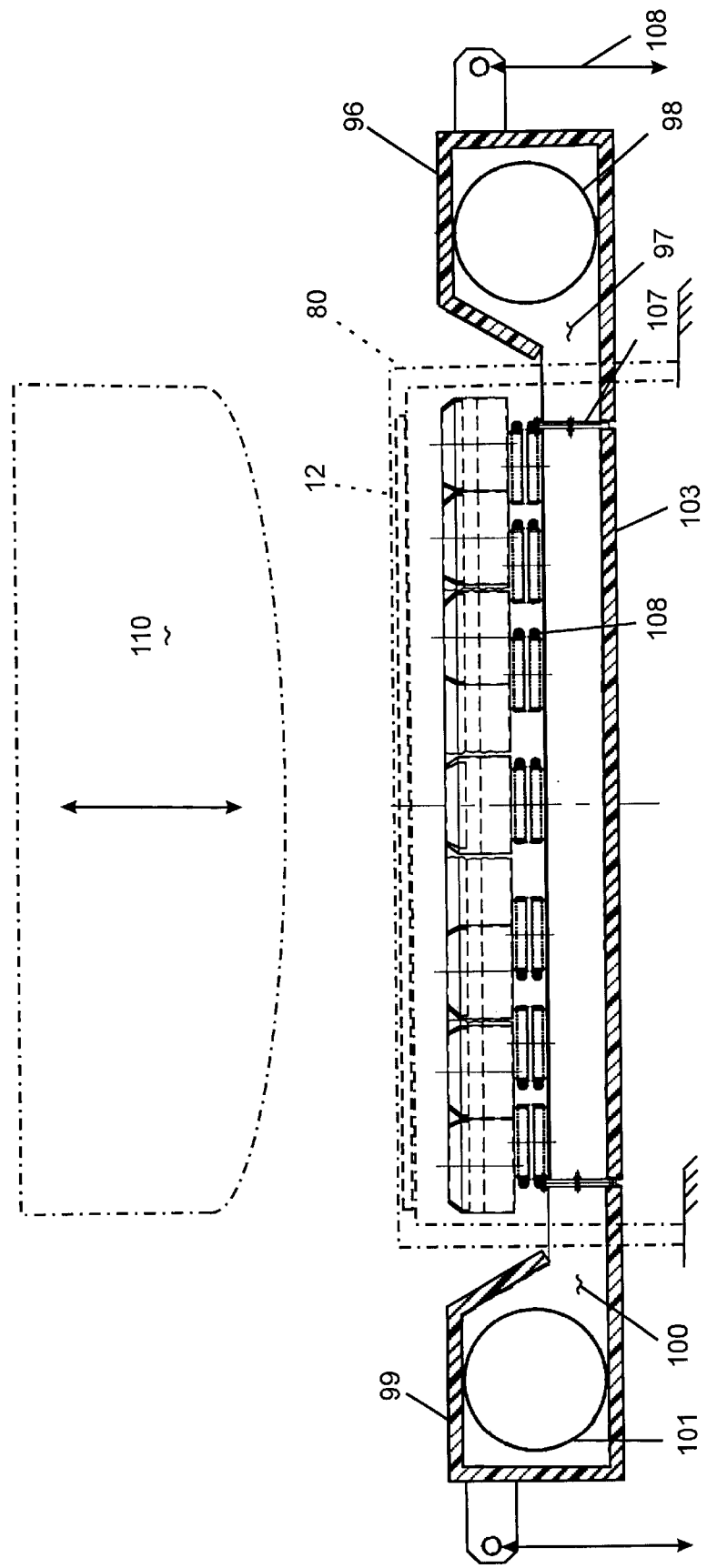
FIG. 9 is a schematic side elevation view taken along lines 9—9 of FIG. 8.

Referring now to FIGS. 8 and 9, a right hand ring plenum 96 defining a right hand ring plenum chamber 97 in fluid communication with a right hand ring inlet 98 extends longitudinally the length of female ring mold 80 and slightly beyond. Similarly, a left-hand ring plenum 99 defining a left-hand ring plenum chamber 100 is in fluid communication with a source of pressurized gas at left hand ring inlet 101. Each ring plenum chamber 97, 100 is in fluid communication with transversely extending first ring feeder duct 103, second ring feeder duct 104 and third ring feeder duct 105. As shown in FIG. 9, ring feeder ducts 103–105 are connected by clamps 107 to right hand and left hand plenums 96, 99. Also, as shown in FIG. 9, a clamp arrangement 108 connects pad inlets 92 with ring feeder ducts 103, 104, 105. In this regard, pad inlet 92 in the preferred embodiment is a tube extending from the bottom of pressure pad housing 32. For each pad inlet 92, similarly sized outlet tube extends upwardly from the feeder ducts. A tubular sleeve slips over and joins the tube of pad inlet 92 and the feeder duct outlet tube by clamp arrangement 108 thereby permitting easy vertical adjustment of the individual pads to assure a co-planar relationship with one another. As with the dumper arrangement, the ring arrangement also utilizes insulated right hand and left hand plenums 96, 99 and insulated first, second and third ring feeder ducts 103, 104, and 105. Because glass sheet 12 is to be centered within female ring mold 80, right hand and left hand plenum chambers 97, 100 are provided to ensure an even gas balance flow for pre-ring pads 83 and ring pads 84. It should also be noted that two pad inlets 92 are provided for the longer ring pads 84, while only one pad inlet is needed for the shorter pre-ring pads 83.

FIG. 9 schematically illustrates a portion of press bending station 21. Female ring mold 80 is stationary. Actuators schematically indicated by arrows 108, raise and lower right and left hand ring plenums 96, 99, first second and third ring feeder ducts 103–105 and pre-ring and ring pads 83, 84 in unison relative to stationary female mold 80. Male mold 110 vertically moves into and out of contact with glass sheet 12. The operation of press bend station 21 is entirely conventional. When glass sheet 12 is positioned over female mold 80, actuators 108 lower the ring pad arrangement so the pads no longer support glass sheet 12 which rests in female mold 80. Male mold 110 moves into contact with glass sheet 12 and presses glass sheet 12 into female ring mold 80 to bend it into its proper shape. Vacuum in male mold 110 is used to lift glass sheet 12 out of female ring mold 80 after forming.

In general operation, glass sheets 12 are conveyed through furnace 18 on ceramic rolls 19. When the glass sheets reach the furnace exit end, a glass run out section of the roll drive goes to high speed and this causes the glass to transfer to dumper pad(s) 82 at a speed of about 50"/sec. The glass is floated about ¼" above the pressure pads on a cushion of air at about 1200° F. The glass is brought to a stop in female ring mold 80 by a conventional guide/stop drive arrangement. For example, retractable end stops such as shown in U.S. Pat. No. 5,735,922 are strategically positioned about female ring mold 80. The elapsed time for the glass to travel from the furnace exit to the press ring is about 2 ½ to 3 seconds. Male mold 110 is then lowered into female ring mold 80 and forms the glass into the desired shape. Male mold 110 is then raised with the glass held in place by means of a vacuum and a shuttle car is then moved under the male mold. (See U.S. Pat. No. 5,735,922.) The glass is dropped onto the shuttle car and the shuttle car transports the glass to the quench station 24 and the glass is subsequently lowered onto rolls and conveyed to unloading station 25 where it is further cooled. During the time the glass sheet transfers to female ring mold 80 it is supported by the described static pressure areas with air at a preset temperature which, in the preferred embodiment, is about 1200° F. Importantly, the heated air maintains the sheets at their desired press forming temperature. Because each sheet is entirely supported on its underside by the heated pressure pad air, the temperature, importantly, is maintained uniformly through the sheet.

Once sheet 12 reaches female ring mold 80 and ring pads 84 and pre-ring pads 83 begin to retract, the air may be "shut off" to prevent any disturbances to sheet 12 while it is bent into shape by male mold 110. That is, at some point in the cycle the air may be either turned off or reduced in pressure or flow to enable male mold 110 to grasp glass sheet 12 and at some point in the cycle, the air is returned to its previous flow level. The exact time in the cycle and the percentage reduction of air flow and/or pressure may vary from one sized glass sheet to the next. However, the times for raising and lowering the pressure pads are relatively quick (a fraction of a second) and the air must be "on/off". When "on" the air must be at the appropriate, steady state, pressure sufficient to float glass sheet 12 at a set height and at the precise set temperature.

Figure 10:
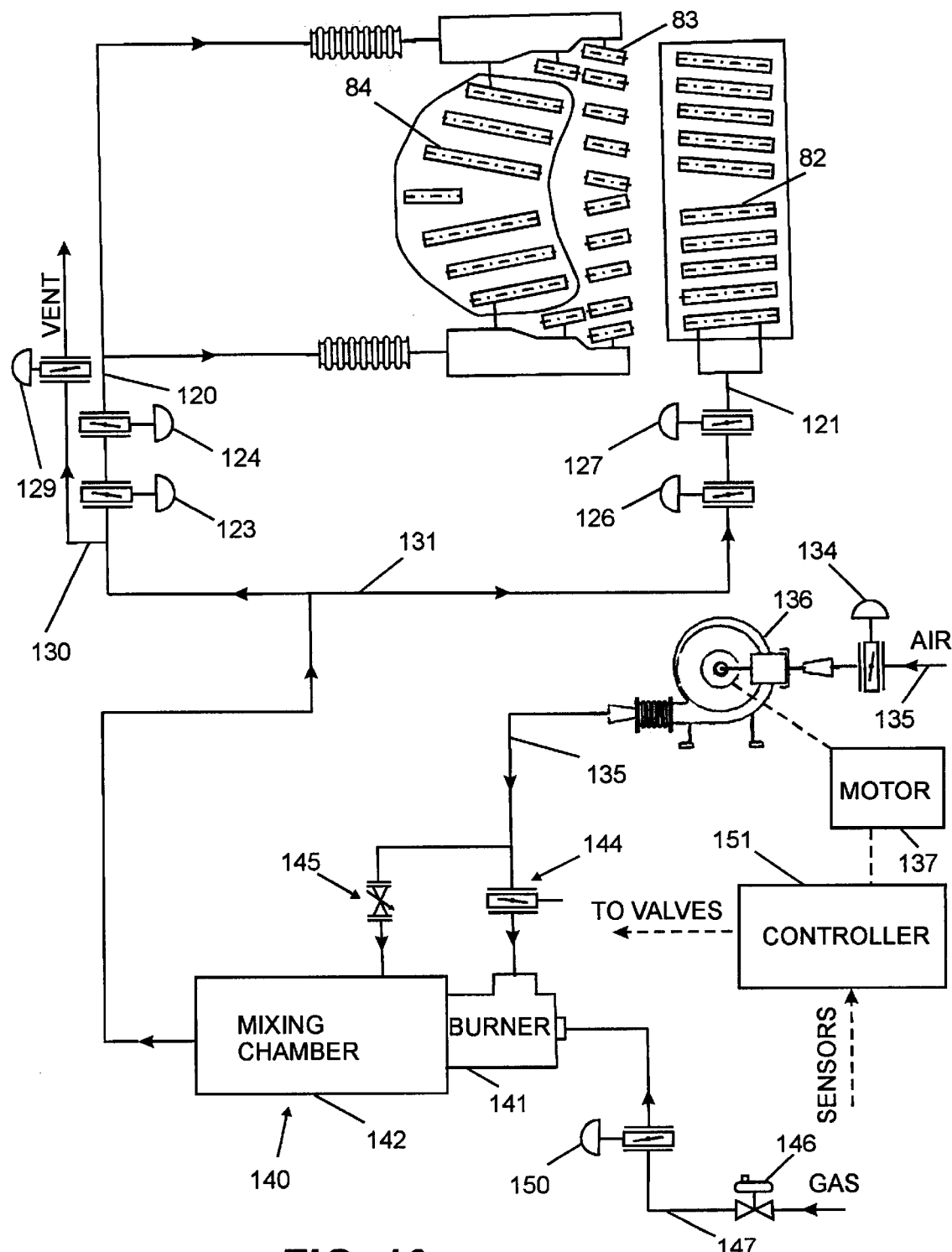
FIG. 10 is a schematic representation of the valving employed in the preferred embodiment of the invention.

It should be appreciated that the press transfer station under discussion in the preferred embodiment requires a relatively large mass of air at set temperature to be quickly supplied and shut off. The pressure pad arrangement of the invention can meet this requirement. Referring to FIG. 10, there is shown schematically a valving arrangement that provides for a fast on/off action having a constant set pressure when "on", exhausting air at a set non-varying temperature. Additionally, the control is easily set to function for system processing a wide range of products. Not shown are the control loops and logic diagrams developing signals for actuating the valving. While the logic is sophisticated, it is believed within the skill of a controls engineer given the functional explanation of the valving set forth below and is thus not shown or described in detail. FIG. 10 will, however, be described in some detail to show that the invention can function to maintain glass sheets 12 at their desired bending temperature while being rapidly cycled "on"-"off" between set pressure limits.

In the arrangement of FIG. 10, air heated at a temperature of 1200° F. in the preferred embodiment is separately valved to right hand and left hand plenum chamber 97, 99 in a ring line 120 and to dumper pad plenum 86 in a dumper line 121. Ring line 120 includes a flexible hose portion shown by reference numeral 120a for vertical movement of pre-ring pads 83 and ring pads 84. A flexible hose could also be provided for dumper line 121 allowing vertical movement of dumper pads 82. Valving for ring line 120 is provided through first and second motorized ring valves 123, 124, respectively. First motorized ring valve 123 is a fast acting valve and strokes between two fixed positions, open or closed. The open position is for glass flotation and the closed position is for reducing the heat load to the area when glass flotation is not required. The stroke time from closed to open or vise-versa is less than about 1 second. Second motorized ring valve 124 is used for adjusting the nozzle pressure within the pressure pads so a given glass sheet 12 can be floated at a desired height, typically about 0.64 cm. Once a valve position is established, it will remain fixed for all glass sheets 12 with the same thickness and shape. The control system thus stores any number of signals corresponding to the different sizes and shapes of glass sheets being processed by the line so that a specific setting for any given glass sheet will be used to suspend the glass sheet at an optimum distance. This two valve arrangement (which has been used before and is not "new" per se) allows for fast on/off cycling at precisely set, metered flow rates. A similar arrangement is used for dumper pads 82. A first motorized dumper valve 126 provides fast open and close cycle times and a second motorized dumper valve 127 provides a specific metering rate set to the size and shape of glass sheet 12 being processed by the line.

A motorized vent valve 129 is provided in a vent line 130 in fluid communication with a feeder supply line 131 distributing heated air to ring line 120 vis-a-vis first and second ring valves 123, 124 and dumper line 121 vis-a-vis first and second motorized dumper valves 126, 127. Vent valve 129 is a two position open-close, valve programmed to open when first motorized ring valve 123 and first motorized dumper valve 126 are closed and vise-versa. The vent valve arrangement in combination with motorized ring valves 123, 124 and dumper valves 126, 127 allow the heated air, at the designed temperature, to flow either to pressure pads 82, 83, 84 or to vent 130. Thus, the turn down requirements of the combustion system are significantly reduced and feeder supply line 131 is maintained in a hot, ready to use condition. That is, an alternative approach of attempting to vary the turn down ratio of the system to account for on/off cycling conditions could result in a temperature change which has to be equilibrated when the line calls for the pressure pads to be activated for glass flotation. The cycling times are too short for such an approach.

To reduce the venting system requirements (i.e., to reduce fuel used for heating air that is discharged through vent line 130) a motorized air valve 134 is provided in an air line 135 through which ambient air to be heated by the system is drawn by a fan 136 driven by a motor 137 with programmable speed control. Air valve 134 is a throttling, fast acting valve operated between a full, open position and a throttled partially closed second position. It should be apparent that all motorized valves operate in synchronization with one another. When the system calls for pressure to be supplied to the pressure pads, vent valve 129 is closed, and first ring valve 123, first dumper valve 126, and air valve 134 are open. When the system calls for the pressure pads to be deactivated (when the pads are lowered) vent valve 129 is open, first ring valve 123 and first dumper valve 126 are closed and air valve 134 is throttled.

Ambient air in air supply line 135 is supplied by fan 136 at a programmable flow rate to a conventional industrial burner 140. As is well known, burner 140 has a burner chamber 141 which receives air and fuel at a set ratio for ignition with the ignited air and fuel products passing into a mixing chamber 142 whereat the air and fuel are combusted, typically in a staged manner, to produce heated products of combustion, i.e., heated air at a desired temperature exhausted into feeder supply line 131. A manually set butterfly type valve 144 distributes a portion of ambient air to burner chamber 141 and a manually set trimming valve 145 meters a portion of ambient air to mixing chamber 142. Manually set valves 144, 145 are set to obtain a mixture temperature of approximately 1200° F. in the preferred embodiment. It is to be noted that other mixture temperatures are possible if manually set valves 144, 145 are set to different positions with different air/fuel ratios.

The rough air to fuel ratio supplied burner 140 is set by a pneumatically actuated back-loaded regulator valve 146 in gas line (natural gas) 147. As is conventionally known, back-loaded regulator valve 146 meters the flow of gas in gas line 147 by movement of a diaphragm, one side of which is connected to air supply line 135 and the other side of which is exposed to ambient, i.e., standard atmosphere. As the flow of air in air supply line 135 varies, the diaphragm in back-loaded regulator valve 146 changes to increase or decrease the supply of gas in gas supply line 147 at an approximate set air/fuel ratio. The air/fuel ratio is adjusted by changing the position of motorized gas valve 150. Motorized gas valve 150 is set at any number of positions by a signal obtained from a temperature control loop which is designed to maintain the mixture at a preset temperature, i.e., 1200° F. That is, by affecting the air/fuel ratio of burner 140, the temperature of the products of combustion and the resulting mixture temperature are changed by changing the signal to motorized gas valve 150. A more stoichiometric ratio will yield higher temperatures and a leaner ratio will result in lower temperatures.

It should be apparent that once manually set valves 144, 145 are set and the temperature control loop is tuned to produce the desired temperature of the products of combustion, burner 140 will produce a heated air stream at a set temperature over any given range of air flow supplied burner 140 by fan 136 in air supply line 135. Accordingly, by programmably controlling the speed of fan motor 137, the maximum flow or pressure supplied to pressure pads 82, 83 and 84 are controlled. That is, once all of the above described valves are set for proper distribution and function, variably controlling the speed of motor 137 obtains the desired pressure in the pressure pads. In essence, the controller regulating the speed of motor 137 is the overall flow controller. Once that speed is programmably set, it should not change for glass sheets 12 with the same thickness and shape. It is to be understood that a controller 151, preferably a programmable controller, in response to sensor inputs (i.e., temperature, flow or pressure, etc.) generates output control signals regulating the motorized valves and speed of motor 137 to operate in the manner described herein. For example, once the positioning of manually set valves 144, 145 is set, a temperature sensor in feeder supply duct 131 outputs a sensor signal to controller 151 which may use a look-up table established during set-up to generate a control signal to motorized valve 150.

FIG. 10 shows that the temperature of the gas, which is typically air, can be precisely controlled and, in practice, establishes a heat transfer contact with glass sheet 12 which tends to maintain glass sheet 12 at its desired bending temperature. In conventional conveyor roller drive arrangements, the temperature of the glass sheet begins to change as soon as it is discharged from furnace 18. Because of the complex shape of the glass article to be formed in the mold, some of the rollers were bent to actually induce a prebend into the glass sheet prior to transfer to male mold 110. In this manner, the sheet would not have to be bent as drastically in male mold 10 to its final shape. However, to a significant extent, the bending of the glass is a temperature dependent function and the pre-bending was desired because of the changing sheet temperature. With the present invention, the glass temperature is maintained at a desired temperature whereat the glass can be bent into shape by male mold 110 and without having to introduce a pre-bend as sometimes done in the prior art.

In describing the pressure pad used in the present invention, specific angles and dimensional relationships have not been set forth because they are believed within the knowledge of one skilled in the art. For example, from a review of the graph shown in FIGS. 4 and 5, it will be apparent that if the width between the opposing jet nozzles, i.e., the space occupied by baffle plate segment 39 is increased, the static pressure area will increase. Tests have also shown that if the spacing between opposing nozzles in a pressure pad is increased, less air flow and less pressure is required to float glass sheets 12. Note that with spacer baffle 60, positioned between adjacent pressure pads, one continuous pressure pad is, in effect, made as shown in FIG. 5. Spacing between opposing slot nozzles in any pressure pad and spacer baffle sizing between pressure pads is a matter of design. The discussion with respect to air flow goes to the spacing between the opposing jets of a given pressure pad used in the array. In addition, the angle of the jets used in the bench model was set at 45°. Different opposing angles and different opposing angles varied in accordance with the spacing between the jets may be utilized should unexpected distortion of the glass appear. Still further, it is within the scope of the present invention to construct a custom fitted pressure pad arrangement from a single sheet of sheet-metal having a transverse dimension at least equal to the transverse dimension of the floated sheet and having opposed pairs of longitudinally-extending slotted nozzles formed therein.

Also, the invention has been described with reference to a press transfer station for glass sheets because this station imposes the highest requirements on a system for transporting glass sheets. Obviously, the transport system can be used in place of any conveyor or rolls now used to transport glass sheets in any number of glass processing lines. Ideally, the system is well suited for conveying heated sheets, for example, within the furnace, or to or from a shaping or heat treating station. In this respect, the air supply arrangement discussed at length in FIG. 10 can be easily modified to supply air to any additional stations minimizing the net cost of the system.

The invention has been described with reference to a preferred embodiment. Obviously, alterations and modifications will become apparent to those skilled in the art upon reading and understanding the Detailed Description of the invention. For example, as noted, the invention has been described with reference to conveying flat glass sheets to the press bending station. Obviously, the pressure pad arrangement can be used to convey the glass sheets through the furnace. In addition, the invention has application outside the glass area and can be used as noted to convey sheets or plates of heated or unheated ferrous or non-ferrous metals, web material, and other objects. It is intended to include all such modifications and alterations insofar as they come within the scope of the present invention.

Having thus defined the invention, it is claimed:

1. A transport system for conveying heated, discrete, glass sheets having length and width traveling in their length direction through a glass processing line having a plurality of stations, the transport system comprising:

a plurality of generally longitudinally-extending pressure pads beneath said sheets, each pad having a pair of longitudinally-extending slot nozzles transversely spaced from each other by a baffle plate providing a static surface area for supporting overlying glass sheets, the slot nozzles angled to oppose one another, a plenum for directing gas under pressure to each pad for discharge through the slot nozzles, and said pads positioned side-by-side with longitudinally-extending slot nozzles of said pads generally aligned with one another to form a pad array that transversely extends a distance at least equal to the width of said glass sheets, said pad array having a longitudinally extending centerline generally parallel to said longitudinally-extending slot nozzles and parallel to said sheet length and the direction of sheet travel.

2. The transport system of claim 1 wherein each pad has adjacent its ends a transversely extending edge slot nozzle whereby each pressure pad has a circumferentially extending slot nozzle extending thereabout.

3. The transport system of claim 1 wherein each pad is sized and transversely positioned relative to an adjacent pad to eliminate any open spacing between adjacent pressure pads so as to prevent exhaust of gas discharged through the slotted nozzle passing between adjacent pressure pads whereby the pressure profile throughout the transverse axis of the transport system can be controlled.

4. The transport system of claim 1 further including a longitudinally and transversely extending spacer baffle positioned between adjacent pressure pads.

5. The transport system of claim 1 wherein the longitudinally extending slotted nozzles of certain pressure pads are laterally inclined at an acute angle less than 90° with the longitudinally extending centerline of said pad array.

6. A transport system for conveying heated glass sheets traveling in a given direction through a glass processing line having a plurality of stations, the transport system comprising:

a plurality of generally longitudinally-extending pressure pads, each pad having a pair of longitudinally-extending slot nozzles transversely spaced from each other by a baffle plate providing a static surface area for supporting overlying glass sheets, the slot nozzles angled to oppose one another;

a plenum for directing gas under pressure to each pad for discharge through the slot nozzles, and a processing/shaping station includes a mold member having a peripheral rim configuration with an open center suitable to support each glass sheet adjacent its peripheral edge, the pressure pad plurality comprising first and second pad pluralities, the first plurality positioned between the mold and the furnace, the second plurality including second pressure pads having especially configured lengths such that the second plurality is contained substantially within the ring opening.

7. The transport system of claim 6 further including a third plurality of pressure pads situated adjacent the ring mold and longitudinally-extending between the first and second pluralities of pressure pads, each third pressure pad inclined at an angle relative to the longitudinal travel axis.

8. The transport system of claim 7 further including the plenum having a plenum chamber, at least first and second feeder ducts in fluid communication, respectively, with the second and third pluralities of pressure pads and the plenum chamber and an actuator for simultaneously raising and lowering the plenum chamber, the feeder ducts and the second and third pluralities of pressure pads relative to the ring mold.

9. The transport system of claim 8 wherein said feeder ducts are positioned vertically beneath the second and third pluralities of pressure pads and extend transversely across the second and third pluralities of pressure pads, each pressure pad having at least one tubular inlet extending from a bottom opening thereof, each feeder duct having a like plurality of tubular outlets equal to the plurality of inlets extending from the associated plurality of pressure pads, a tubular sleeve receiving each inlet and outlet and a clamp for each sleeve.

10. The transport system of claim 9 wherein said plenum chamber is in fluid communication with each feeder duct at an axial end thereof.

11. The transport system of claim 10 further including a second plenum in fluid communication with selected feeder ducts at the opposite axial end thereof.

12. The transport system of claim 8 further including a burner for generating a heated air stream, a feeder supply line for directing the heated air stream to said plenum, a first open/close motorized valve controlling the flow of heated air to said plenum, a second valve downstream of said first valve controlling the rate of flow of said heated air to said plenum; a vent line in fluid communication with said feeder supply line upstream of said first valve, a vent open/close valve in said vent line and a controller opening said first valve and closing said vent valve when heated air is to be supplied to said plenum chamber and closing said first valve and opening said vent valve when glass sheets are positioned over said ring type mold member.

13. The transport system of claim 4 wherein selected pressure pads have edge slot nozzles at the longitudinal ends of the pressure pads, said edge nozzles extending transversely across the pressure pad.

14. A transport mechanism for supporting thin, discrete sheets of material traveling along a longitudinally-extending work axis, each sheet having a length dimension extending on an axis co-incident with said work axis so that the sheets travel parallel to their length and a width dimension transverse and orthogonal to said length dimension, said transport mechanism comprising:

a) a plurality of generally longitudinally-extending pressure pads beneath said sheets, each pressure pad having a pair of longitudinally-extending, generally parallel slot nozzles transversely spaced from each other by a baffle surface and angled to direct gas streams opposing one another;

b) a plenum defining a plenum chamber therein in fluid communication with each pressure pad for directing gas for directing gas under pressure to each pad for discharge through said slot nozzles; and, c) said pads positioned side-by-side with said longitudinally-extending slot nozzles of said pads aligned with one another to form a pad array that transversely extends a distance at least equal to the width of said sheets, said pad array having a longitudinally extending centerline generally parallel to said longitudinally-extending slot nozzles and parallel to said sheet length and the direction of sheet travel.

15. The transport mechanism of claim 14 further including a spacer baffle positioned between any gap between transversely adjacent pressure pads to prevent exhaust of spent gas therebetween.

16. The transport mechanism of claim 15 wherein selected pressure pads have edge slot nozzles at the longitudinal ends of the pressure pads, said edge nozzles extending transversely along the pressure pad.

17. A transport mechanism for supporting thin glass sheets heated to a plastic material for a glass bending operation, said glass sheets traveling along a longitudinally-extending work axis, said sheets having a length dimension extending on an axis co-incident with said work axis and a width dimension transverse and, orthogonal to said length dimension, said transport mechanism comprising:

a) a plurality of generally longitudinally-extending pressure pads, each pressure pad having a pair of longitudinally-extending, generally parallel slot nozzles transversely spaced from each other by a baffle surface and angled to direct jet streams opposing one another, each parallel slot nozzle extending the length of an associated pressure pad;

b) selected pressure pads having edge jet nozzles at the longitudinal ends of the pressure pads, said edge nozzles extending transversely along the pressure pad;

c) a plenum defining a plenum chamber therein in fluid communication with each pressure pad for directing gas under pressure to each pressure pad for directing gas under pressure to each pad for discharge through said nozzles; and, d) said pressure pads spaced side-by-side in an array to at least span said sheet's width dimension;

e) a spacer baffle positioned between any gap between transversely adjacent pressure plates to prevent exhaust of spent gas therebetween; and, f) a ring type mold member having a peripheral rim configuration with an open center suitable to support each glass sheet adjacent its peripheral edge, the pressure pad plurality comprising first and second pad pluralities, the first plurality positioned between the mold and the furnace and having generally similar lengths, the second plurality including second pressure pads having especially configured lengths such that the second plurality is contained substantially within the ring opening.

18. The transport mechanism of claim 17 further including a first feeder duct in fluid communication with said first plurality of pressure pads and said plenum chamber, a second feeder duct in fluid communication with said second plurality of pressure pads and said plenum, and an actuator for moving said second feeder duct and said second plurality of pressure pads in unison in a vertical direction relative to said ring mold.

19. The transport mechanism of claim 18 further including a burner for generating a heated air stream, a feeder supply line for directing the heated air stream to said plenum, a first open/close motorized valve controlling the flow of heated air to said plenum, a second valve downstream of said first valve controlling the rate of flow of said heated air to said plenum; a vent line in fluid communication with said feeder supply line upstream of said first valve, a vent open/close valve in said vent line and a controller opening said first valve and closing said vent valve when heated air is to be supplied to said plenum chamber and closing said first valve and opening said vent valve when glass sheets are positioned over said ring type mold member.

20. In a transport mechanism for conveying thin glass sheets having a length and width moving in a direction parallel to its length and heated to a plastic condition, the improvement comprising:

a plurality of generally longitudinally-extending pressure pads positioned beneath said sheets in an array over which a glass sheet is positioned; each pressure pad having a pair of longitudinally-extending slot nozzles transversely spaced from each other by a baffle plate providing a static surface area for supporting overlying glass sheets, the slot nozzles angled to oppose another, a plenum for directing gas heated to a set temperature at a set pressure to each pad for discharge through said slot nozzles, and said pads positioned side-by-side with said longitudinally-extending slot nozzles of said pads generally aligned with one another to form a pad array that transversely extends a distance at least equal to the width of said glass sheets, said pad array having a longitudinally extending centerline generally parallel to said longitudinally-extending slot nozzles and parallel to said sheet length and the direction of sheet travel.

21. The transport mechanism of claim 20 further including a longitudinally and transversely extending spacer baffle positioned between adjacent pressure pads.

22. The transport mechanism of claim 21 wherein each pad has adjacent its ends a transversely extending edge slot nozzle whereby each pressure pad has a circumferentially extending slot nozzle extending thereabout.

23. The transport mechanism of claim 22 wherein certain pads on one side of said pad centerline have longitudinally-extending slot nozzles oriented to form an acute angle with said pad centerline while other certain pads on the opposite side of said pad centerline have longitudinally-extending slot nozzles oriented to form an acute angle with said pad centerline whereby said longitudinally-extending slot nozzles of said certain and other certain pads form a "V" shape.

24. A method for floating discrete glass sheets traveling in a given direction comprising the steps of:

a) providing underneath said sheets a plurality of longitudinally-extending pressure pads having generally parallel, longitudinal slot nozzles transversely spaced from one another by a baffle plate with longitudinal slot nozzles oriented in a direction to oppose one another, said pads placed side-by-side with longitudinal slot nozzles of any given pad in general alignment with longitudinal slot nozzles of an adjacent pad to form a pad array having a width at least equal to the width of said articles, a length equal to the length of said longitudinally-extending slot nozzles, and a longitudinal centerline extending in the direction of said longitudinal slot nozzles; and b) directing a gas stream, uniformly through said slot nozzles, under pressure to create opposing gas streams exiting said longitudinal slot nozzles and impinging one another to create a static gas pressure area between said nozzles, said baffle plate and the underside of said article; said pad array's longitudinal centerline generally parallel to said article's length whereby said pressure pads static pressure areas stably support said articles; and, c) moving said articles parallel to said pad array's longitudinal centerline.

25. The method of claim 24 wherein said glass sheet is at a temperature of about 950–1250° F. and the pressure of the gas is at a set value sufficient to produce gas streams exiting said slot nozzles at velocities not capable of forming free standing jets and between about 2,500 to 5,000 ft/min whereby semi-viscous, easily deformable glass sheets are floated.

26. The method of claim 24 wherein said glass sheets serially travel over said pads, said sheets traveling generally longitudinally.

27. The method of claim 26 further including the steps of providing transversely extending edge nozzles adjacent the ends of selected pressure pads, said edge nozzles oriented to oppose one another and directing said gas through said edge nozzles to support leading and trailing edges of each glass sheet as it travels onto and off of said pressure pads.

28. The method of claim 26 further including the steps of providing a longitudinally-extending spacer baffle between adjacent pressure pads, said gas exiting a slot nozzle of any given pressure pad forming with gas exiting a slot nozzle of an adjacent pressure pad a static pressure of gas between said spacer baffle, said underside of said plate and said slot nozzles of said adjacent pressure pads whereby a generally constant longitudinally and transversely extending static pressure area exists over the entire pressure pad array to support each glass sheet.

29. The method of claim 28 further including the steps of providing a longitudinally-extending perforated plate within each pressure pad beneath said baffle, and directing said pressurized gas from a plenum adjacent an end of each pressure pad to cause said gas to pass through said perforations before exiting said nozzles of each pressure pad whereby gas streams at generally uniform pressure exit said slot nozzles of said pressure pads.

30. The method of claim 26 further including the step of providing certain pads on one side of said pad centerline have longitudinally-extending slot nozzles oriented to form an acute angle with said pad centerline while other certain pads on the opposite side of said pad centerline have longitudinally-extending slot nozzles oriented to form an acute angle with said pad centerline whereby said longitudinally-extending slot nozzles of said certain and other certain pads form a "V" shape so that any discrete surface area of the underside of said glass sheet is not constantly exposed to a stream of gas exiting from said slot nozzles as the sheet travels along said pads.

31. A method for floating a plurality of glass sheets serially traveling in a generally longitudinal direction comprising the steps of:

a) providing a plurality of generally longitudinally-extending pressure pads beneath said glass sheet, each pad having a pair of longitudinally-extending slot nozzles transversely spaced from one another by a baffle with nozzles oriented in a direction to oppose one another;

b) directing a gas stream uniformly through said nozzles under pressure to create opposing gas streams exiting said slot nozzles, traveling across said baffle and impinging one another to create a static gas pressure area between said nozzles, said baffle and the underside of said glass sheet for floating same;

c) providing a longitudinally-extending perforated plate within each pressure pad beneath said baffle, and directing said pressurized gas from a plenum adjacent an end of each pressure pad to cause said gas to pass through said perforations before exiting said nozzles of each pressure pad whereby gas streams at generally uniform pressure exit said slot nozzles of said pressure pads; and d) providing a ring mold having a peripheral rim configuration for supporting the edges of said glass sheet, a second plurality of pressure pads within said ring mold, a first plurality of pressure pads outside said ring mold and over which said glass sheet travels before reaching said ring mold and separate plenums directing heated gas to said first and second pressure pad pluralities, said method including the additional steps of reducing the pressure of said gas to said second pressure pad plurality and lowering the said second pressure pad plurality when said glass sheet is positioned over said ring mold and raising and reapplying gas pressure to said second pressure pad plurality when said glass sheet has been lifted from said ring mold.

32. A method for floating a plurality of glass sheets serially traveling in a generally longitudinal direction comprising the steps of:

a) providing a plurality of generally longitudinally-extending pressure pads beneath said glass sheet, each pad having a pair of longitudinally-extending slot nozzles transversely spaced from one another by a baffle with slot nozzles oriented in a direction to oppose one another, said pads positioned side-by-side so that said longitudinally-extending slot nozzles of said pads are generally aligned with one another to form a pad array that transversely extends a distance at least equal to the width of said glass sheets, said pad array having a longitudinally extending centerline generally parallel to said longitudinally-extending slot nozzles and parallel to said sheet length and the direction of sheet travel;

b) directing a gas stream uniformly through said slot nozzles under pressure to create opposing gas streams exiting said slot nozzles, traveling across said baffle and impinging one another to create a static gas pressure area between said slot nozzles, said baffle and the underside of said glass sheet for floating same;

c) providing a longitudinally-extending spacer baffle between adjacent pressure pads, said gas exiting a slot nozzle of any given pressure pad forming with gas exiting a slot nozzle of an adjacent pressure pad a static pressure of gas between said spacer baffle, said underside of said plate and said slot nozzles of said adjacent pressure pads whereby a generally constant longitudinally and transversely extending static pressure area exists over the entire pressure pad array to support each glass sheet;

d) providing transversely extending edge slot nozzles adjacent the ends of selected pressure pads, said edge slot nozzles oriented to oppose one another and directing said gas through said edge nozzles to support leading and trailing edges of each glass sheet as it travels onto and off of said pressure pads; and, e) moving said sheets parallel to the longitudinal centerline of said pad array.

33. The method of claim 32 further including the step of providing certain pads on one side of said pad centerline have longitudinally-extending slot nozzles oriented to form an acute angle with said pad centerline while other certain pads on the opposite side of said pad centerline have longitudinally-extending slot nozzles oriented to form an acute angle with said pad centerline whereby said longitudinally-extending slot nozzles of said certain and other certain pads form a "V" shape so that any discrete surface area of the underside of said glass sheet is not constantly exposed to a stream of gas exiting from said slot nozzles as the sheet travels along said plenum chamber.

34. A method for floating a plurality of glass sheets serially traveling in a generally longitudinal direction comprising the steps of:

a) providing a plurality of generally longitudinally-extending pressure pads beneath said glass sheet, each pad having a pair of longitudinally-extending slot nozzles transversely spaced from one another by a baffle with nozzles oriented in a direction to oppose one another, said pads positioned side-by-side so that said longitudinally-extending slot nozzles of said pads are generally aligned with one another to form a pad array that transversely extends a distance at least equal to the width of said glass sheets, said pad array having a longitudinally extending centerline generally parallel to said longitudinally-extending slot nozzles and parallel to said sheet length and the direction of sheet travel;

b) directing a gas stream uniformly through said nozzles under pressure to create opposing gas streams exiting said slot nozzles, traveling across said baffle and impinging one another to create a static gas pressure area between said nozzles, said baffle and the underside of said glass sheet for floating same;

c) providing a longitudinally-extending spacer baffle between adjacent pressure pads, said gas exiting a slot nozzle of any given pressure pad forming with gas exiting a slot nozzle of an adjacent pressure pad a static pressure of gas between said spacer baffle, said underside of said plate and said slot nozzles of said adjacent pressure pads whereby a generally constant longitudinally and transversely extending static pressure area exists over the entire pressure pad array to support each glass sheet;

d) providing transversely extending edge nozzles adjacent the ends of selected pressure pads, said edge nozzles oriented to oppose one another and directing said gas through said edge nozzles to support leading and trailing edges of each glass sheet as it travels onto and off of said pressure pads;

e) causing said glass sheets to travel at a generally acute angle relative to the longitudinally-extending axis of said pressure pads whereby any discrete surface area of the underside of said glass sheet is not constantly exposed to a stream of gas exiting from said slot nozzles as the sheet travels along said plenum chamber; and, f) providing a ring mold having a peripheral rim configuration for supporting the edges of said glass sheet, a first plurality of pressure pads within said ring mold, a second plurality of pressure pads outside said ring mold and over which said glass sheet travels before reaching said ring mold and separate plenums directing heated gas to said first and second pressure pad pluralities, said method including the additional steps of reducing the pressure of said gas to said second pressure pad plurality and lowering the said second pressure pad plurality when said glass sheet is positioned over said ring mold and raising and reapplying gas pressure to said second pressure pad plurality when said glass sheet has been lifted from said ring mold.

35. The method of claim 34 wherein said glass sheet is at a temperature of about 950–1250° F. and the pressure of the gas is at a set value sufficient to produce gas streams exiting said slot nozzles at velocities not capable of forming free standing jets and between about 2,500 to 5,000 ft/min whereby semi-viscous, easily deformable glass sheets are floated.

36. The transport system of claim 5 wherein said pressure pads are arranged in an array having a center longitudinally extending axis and said certain pads inclined at an acute angle relative to said work flow axis and arranged in a symmetrical pattern about said center axis so that approximately half of said certain pads forming acute angles with said work flow axis are on one side of said center axis while the other half of said certain pads forming an acute angle with said center axis are on the opposite side of said center axis.

37. The transport mechanism of claim 14 wherein said pressure pads are arranged in an array having a center longitudinally extending axis generally parallel to said work axis, select pads longitudinally extending at an acute angle relative to said center axis and arranged in a symmetrical pattern about said center axis so that about half of said select pads are on one side of said center axis while the other half of said select pads are positioned on the opposite side of said center axis.

38. The transport mechanism of claim 20 wherein said array has a center longitudinally extending axis, select pads longitudinally extending at an acute angle relative to said center axis and arranged in a symmetrical pattern so that approximately half of said select pads are on one side of said center axis while the other half of said select pads are positioned on the opposite side of said center axis.

39. A transport system for conveying a generally flat article having a length and width moving in a direction parallel to its length onto said transfer mechanism comprising:

a plurality of pressure pads beneath said article, each pad having a pair of generally parallel longitudinal slot nozzles extending the length of said pad, a baffle plate transversely between said longitudinal slot nozzles extending the length of said pad, said longitudinal slot nozzles orientated to oppose each other with said baffle plate therebetween;

a plenum for directing gas under pressure to said slot nozzles; and, said pressure pads transversely spaced side-by-side to form a pad array spanning the width of said article with said longitudinal slot nozzles of adjacent pads generally aligned with one another, said pad array having a longitudinal centerline extending in the direction of said longitudinal slot nozzles and said array centerline parallel with said article length and parallel with the direction of said article movement.

40. The transport system of claim 39 further including a longitudinal spacer baffle between adjacent pressure pads in said array.

41. The transport system of claim 39 further including an edge slot nozzle for each pressure pad in said array adjacent the ends of said longitudinal slot nozzles.

42. The transport system of claim 39 wherein said longitudinal slot nozzles of at least some of said pressure pads transversely situated on one side of said pad array's longitudinal centerline form an acute angle with said longitudinal centerline of less than 90° while at least some of said pressure pads transversely situated on the opposite side of said pad array's longitudinal centerline form an angle with said longitudinal centerline of less than 90°.

43. The transport system of claim 39 wherein the length of said article is equal to or less than the width of said article.

44. A method for serially conveying a plurality of articles having a width and length comprising the steps of:
   a) providing beneath said article a plurality of longitudinally-extending pressure pads having generally parallel, longitudinal slot nozzles transversely spaced from one another by a baffle plate with longitudinal slot nozzles oriented in a direction to oppose one another, said pads placed side-by-side with longitudinal slot nozzles of any given pad in general alignment with longitudinal slot nozzles of an adjacent pad to form a pad array having a width at least equal to the width of said articles, a length equal to the length of said longitudinal slot nozzles, and a longitudinal centerline extending in the direction of said longitudinal slot nozzles;
   b) moving said articles serially in a direction parallel to said length of said articles and said pad array's longitudinal centerline onto and over said pressure pad array; and,
   c) directing a gas stream uniformly through said slot nozzles, under pressure to create opposing gas streams exiting said longitudinal slot nozzles and impinging one another to create a static gas pressure area between said nozzles, said baffle plate and the underside of said article; said pad array's longitudinal centerline generally parallel to said article's length whereby said pressure pads static pressure areas stably support said articles as said articles travel in the direction of said pad array's longitudinal centerline.

45. The method of claim 44 further including the steps of providing a longitudinally-extending spacer baffle between adjacent pressure pads in said array, said gas directing step creating not only a static pressure between nozzles of any given pressure but also creating additional static pressure areas between adjacent pressure pads to stably support said article without under pressure areas.

46. The method of claim 44 wherein each article has a leading edge an a trailing edge and further including the steps of providing an edge slot nozzle for each pressure pad adjacent the ends of said longitudinally-extending slot nozzles whereby a slot nozzle circumferentially extends about each pressure pad and said gas directing step causes gas from said edge slot nozzles to contact and prevent said leading and trailing edges of said article from contacting said pressure pads as each article enters and leaves said pressure pad array.

47. The method of claim 44 wherein said articles are glass sheets, said gas is heated and at least some of said pressure pads transversely positioned on one side of said array's longitudinal centerline have longitudinally extending slot nozzles forming an acute angle of less than 90° with said longitudinal centerline while at least some of said pressure pads transversely positioned on the opposite side of said array's longitudinal centerline have longitudinally extending slot nozzles forming an acute angle of less than 90° with said array's longitudinal centerline and said moving step prevents any gas streams from constantly impinging any discrete area of said glass sheets to minimize optical distortion of said glass sheets.

48. The method of claim 47 wherein said glass sheets are flat, have a thickness in two sheet laminated form or singly of around 3 mm and are at temperatures of about 950 to 1250° F. resulting in semi-viscous, easily deformable glass sheets and said gas is at pressure incapable of forming free standing jets at said slot nozzles.

49. The method of claim 48 wherein said pressure is set to produce slot gas velocities of about 2,500 to 5,000 ft/min whereat said gas is transitioning from laminar to turbulent flow.

* * * * *